US010521485B1

(12) United States Patent
Warman et al.

(10) Patent No.: US 10,521,485 B1
(45) Date of Patent: *Dec. 31, 2019

(54) MEASURING PAGE VALUE

(71) Applicant: Amazon Technologies, Inc., Seattle, WA (US)

(72) Inventors: Leon Robert Warman, Aptos, CA (US); Samuel John Young, Seattle, WA (US); Peter Sven Vosshall, Bainbridge Island, WA (US); Kurt Kufeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/662,054

(22) Filed: Jul. 27, 2017

Related U.S. Application Data

(63) Continuation of application No. 14/518,961, filed on Oct. 20, 2014, now Pat. No. 9,747,382.

(51) Int. Cl.
| | |
|---|---|
| *G06F 17/30* | (2006.01) |
| *G06F 16/958* | (2019.01) |
| *G06F 16/907* | (2019.01) |
| *G06F 16/955* | (2019.01) |

(52) U.S. Cl.
CPC ......... *G06F 16/958* (2019.01); *G06F 16/907* (2019.01); *G06F 16/955* (2019.01)

(58) Field of Classification Search
None
See application file for complete search history.

(56) References Cited

U.S. PATENT DOCUMENTS

| | | | |
|---|---|---|---|
| 6,622,168 B1 | 9/2003 | Datta | |
| 7,171,443 B2 | 1/2007 | Tiemann et al. | |
| 7,225,407 B2 | 5/2007 | Sommerer et al. | |
| 7,594,001 B1 | 9/2009 | Ebbo et al. | |
| 8,401,977 B2 * | 3/2013 | Ma | G06F 16/9535 706/11 |
| 8,839,087 B1 | 9/2014 | Hayden | |
| 8,893,014 B1 * | 11/2014 | Au | G06F 16/9574 715/745 |
| 9,117,002 B1 | 8/2015 | Jenkins et al. | |
| 9,137,210 B1 | 9/2015 | Joglekar et al. | |
| 9,166,882 B1 | 10/2015 | Hill | |
| 9,319,346 B2 * | 4/2016 | Hedbor | H04L 47/70 |
| 9,374,244 B1 | 6/2016 | Brandwine | |
| 10,013,500 B1 * | 7/2018 | McClintock | H04L 67/02 |
| 2004/0001104 A1 | 1/2004 | Sommerer et al. | |
| 2008/0228675 A1 | 9/2008 | Duffy et al. | |
| 2008/0256068 A1 | 10/2008 | Ma et al. | |
| 2013/0080421 A1 | 3/2013 | Taylor et al. | |

* cited by examiner

*Primary Examiner* — Debbie M Le
(74) *Attorney, Agent, or Firm* — Klarquist Sparkman, LLP

(57) ABSTRACT

Techniques and solutions for measuring web page value are described. For example, web page content information for a web page can be obtained. The web page can be decomposed into web page content components based on the web page content information. Content types can be determined for the web page content components. The web page content components can be weighted based on the content types and/or based on other criteria. Web page resources can be obtained in advance for web pages and/or content components based on the weights.

20 Claims, 20 Drawing Sheets

MEASURING PAGE VALUE

CROSS REFERENCE TO RELATED APPLICATIONS

This is a continuation of U.S. patent application Ser. No. 14/518,961, filed Oct. 20, 2014, which is incorporated by reference herein.

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

In some situations, web browsing involves the user selecting a web page and then visiting a number of links to other web pages. Sometimes the user is following the links to obtain additional information regarding a topic of the original web page, and other time the user is just looking for interesting content. Until the user selects a link to another web page, the user may not know exactly what type of content will be present on the other web page. For example, the user may be frustrated if the user clicks on a link expecting to view a web page with content of interest but instead is presented with a web page full of advertisements and/or content that user is not interested in.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
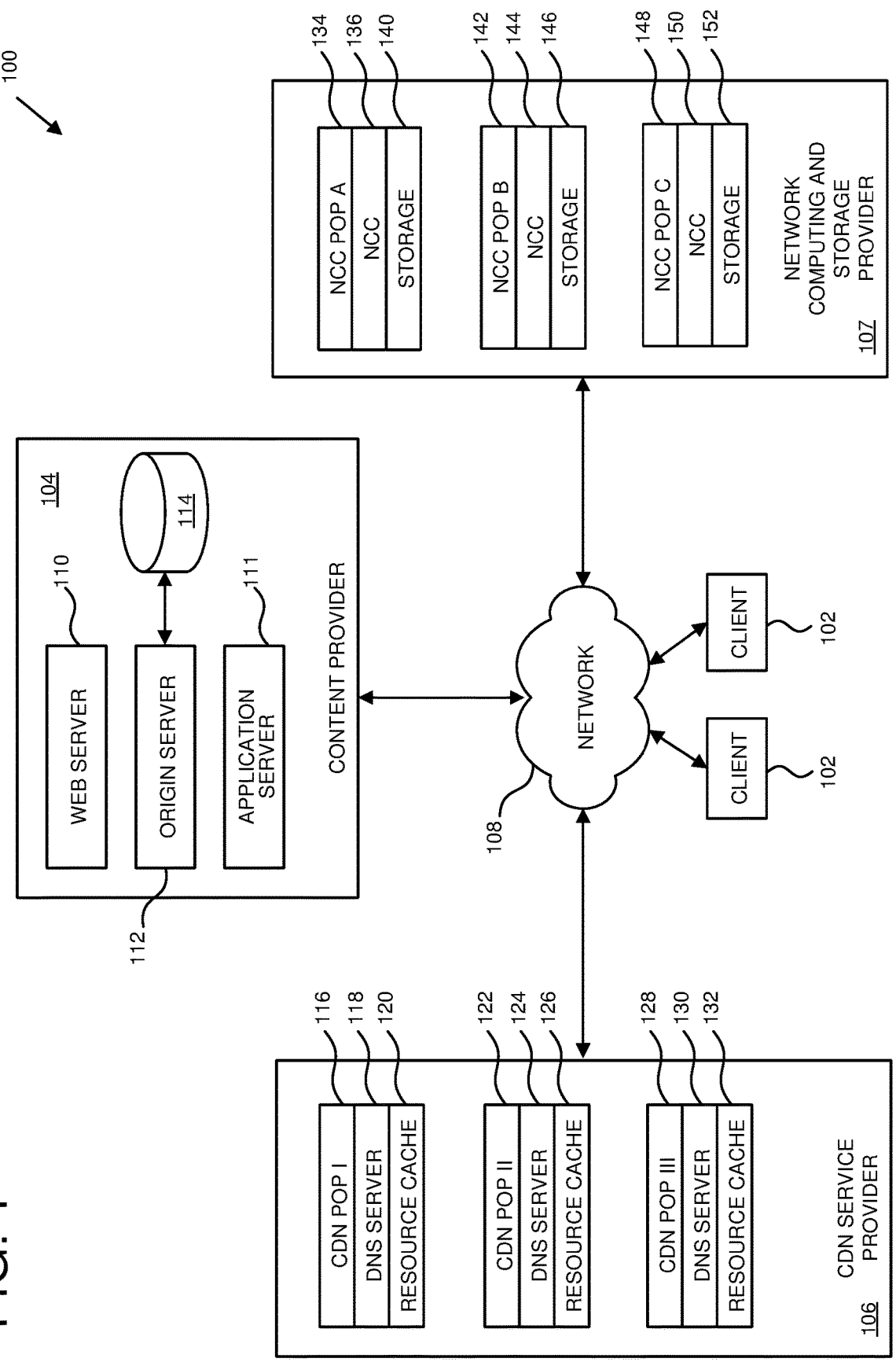
FIG. 1 is a block diagram illustrative of a content delivery environment including a number of client computing devices, content provider, a content delivery network service provider, and a network computing and storage provider.

The following description is directed to techniques and solutions for measuring web page value. For example, the value of a web page can be determined by obtaining web page content information for the web page (e.g., HTML for the web page), decomposing the web page into web page content components, determining content types for the web page content components, and determining weights to the web page content components based on the content types and/or based on other criteria (e.g., user-specific browsing history and/or aggregate browsing history). Using the weights, the web page (or the content components individually) can be evaluated for obtaining in advance. For example, web page resources for web pages (or individual content components) can be obtained in advance of being selected by a user and stored (e.g., as pre-fetched resources) at a server environment and/or at a client device. The web page resources that are obtained in advance can also be pre-rendered at a server environment and/or at a client device.

Determining the value of web pages in advance can provide improvements in terms of computing resource utilization and user experience. For example, a current web page being viewed by a user may have a number of links to other web pages. The value of the other web pages can be determined to decide which of the other web pages should be obtained in advance (e.g., those other web pages with a high weight, which can indicate that the other web pages have high-value content which is likely to be selected by the user or likely to be of interest to the user). Web pages with a high value can be obtained in advance and pre-rendered so that they are available for quick display when selected by the user. In addition computing resources can be saved by not obtaining web pages with a lower weight (e.g., those web pages that are likely not of interest to the user or that have little relevant content).

Generally described, some aspects of the present disclosure are directed to the generation and management of a remote application session between client computing devices and content providers in conjunction with a network computing and storage provider. Specifically, some aspects of the disclosure will be described with regard to the request for a browse session by a client computing device with a content provider, the establishment of a remote browse session between the client computing device and a network computing and storage provider, and the transmission of browse session state data and client interaction data between the client computing device and the network computing and storage provider. Although some aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing and storage provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing and storage provider, including the selected URL. The address or location of a network computing and storage provider capable to service the browse session request may be hardcoded into the browser, may be configurable by the user, may be obtained from a network address service, or may be determined in any other way.

In an illustrative embodiment, responsive to the browse session request received from the client computing device, the network computing and storage provider may instantiate or cause to have instantiated one or more computing components associated with the network computing and storage provider that will host a browser software application. For example, the network computing and storage provider can instantiate, or cause to have instantiated, an instance of a virtual machine that includes a software browser application capable of requesting resources from a communication network. Illustratively, in some situations, one or more devices associated with the network computing and storage provider may be located in a data center or other robustly networked computing environment, and, as compared to the client computing device, may experience relatively little latency or delay when obtaining network resources.

Using the instantiated network computing components, the network computing and storage provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing and storage provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing and storage provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing and storage provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing and storage provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing and storage provider 107 may maintain separate POPs for providing the NCC and the storage components. Additionally, although the NCC POPs 134, 142, 148 are illustrated in FIG. 1 as logically associated with a network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Even further, one skilled in the relevant art will appreciate that the components of the network computing and storage provider 107 and components of the CDN service provider 106 can be managed by the same or different entities.

With reference to FIGS. 2-11, the generation and processing of network content in the context of a remote browse session instantiated at a network computing provider 107 will be described. Example embodiments of web page valuation in the context of the networked computing environment of FIG. 1 will be described further below with respect to FIG. 12. Additional example embodiments of web page valuation will be described further below with respect to FIGS. 13-19.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing and storage provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
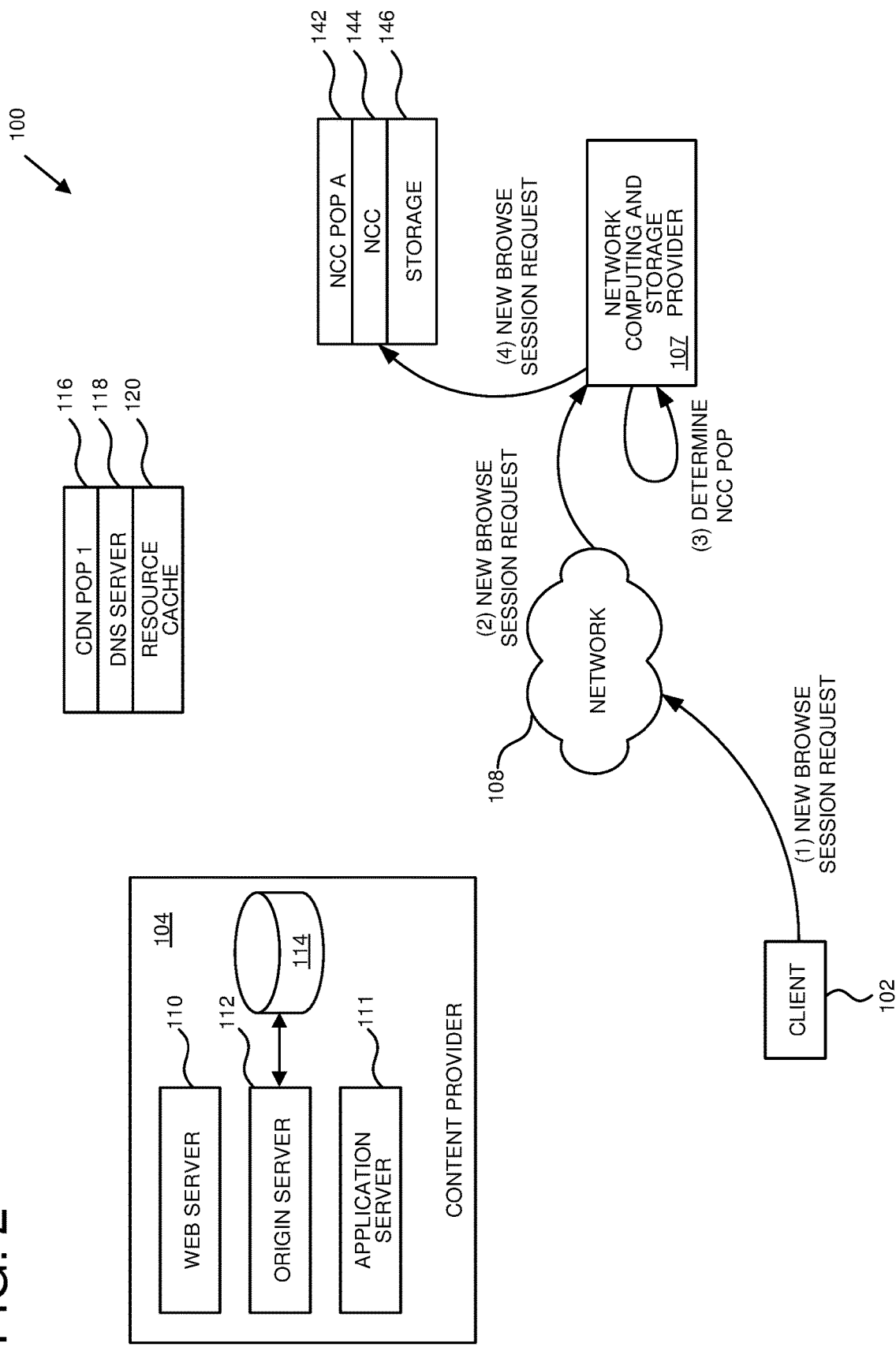
FIG. 2 is a block diagram of the content delivery environment of FIG. 1 illustrating the generation and processing of a new browse session request from a client computing device to a network computing and storage provider.

With reference to FIG. 2, the process can begin with the generation and processing of a browse session request from a client computing device 102 to a network computing and storage provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing and storage provider 107. In an illustrative embodiment, the network computing and storage provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing and storage provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
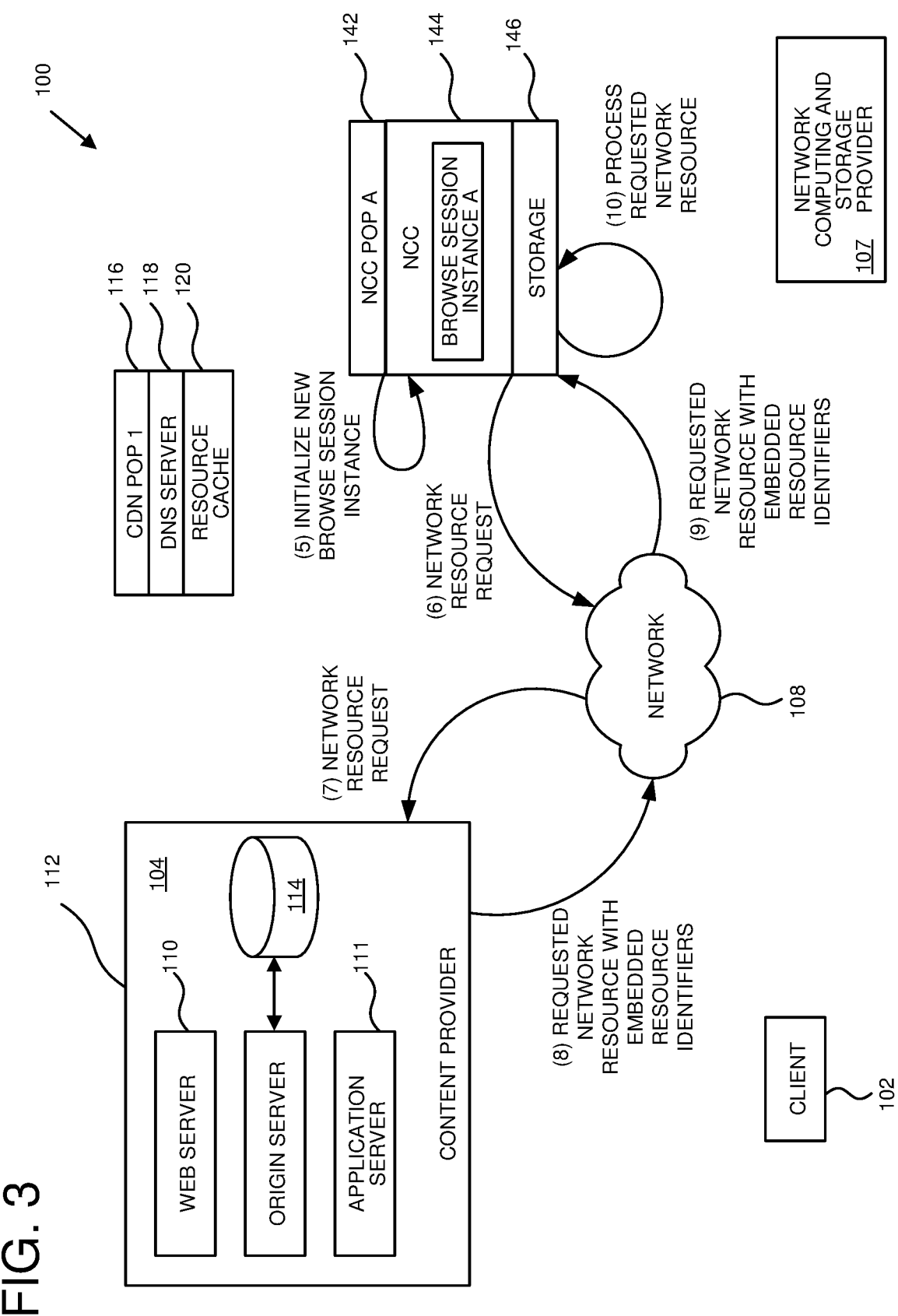
FIG. 3 is a block diagram of the content delivery environment of FIG. 1 illustrating the generation and processing of a request for a network resource from a network computing and storage provider to a content provider.

With reference to FIG. 3, an illustrative interaction for generation and processing of a request for a network resource from a network computing and storage provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing and storage provider (not shown), and may request the Web page from the content provider 104 at the resolved IP address. In various embodiments, a network resource may be retrieved from any combination of content providers, content delivery network (hereinafter "CDN") servers, or caches associated with the network computing and storage provider 107. For example, the network computing and storage provider may check if a resource is stored in a local cache or in another server or service provider associated with the network computing and storage provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
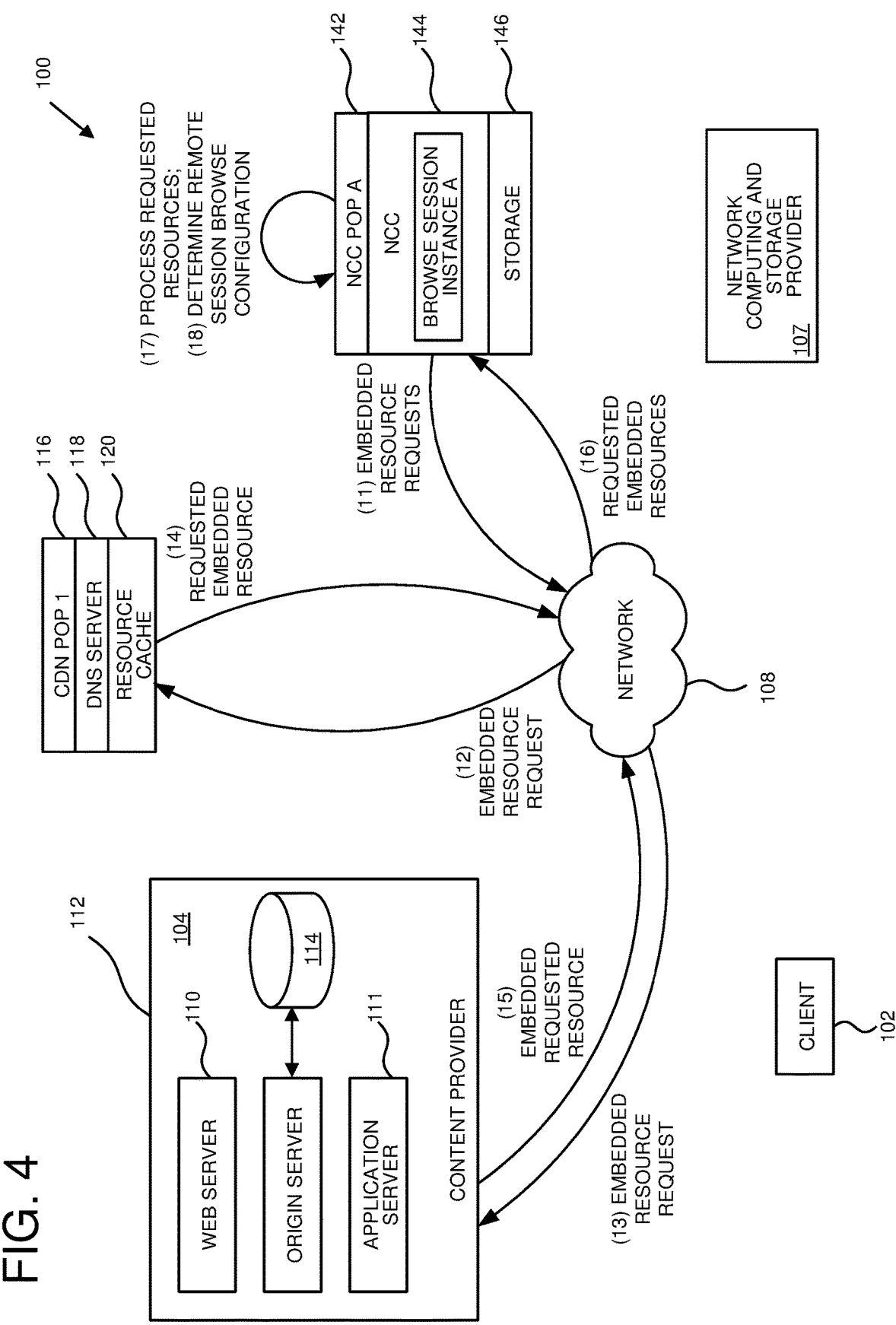
FIG. 4 is a block diagram of the content delivery environment of FIG. 1 illustrating the generation and processing of one or more requests corresponding to one or more embedded resources from a network computing and storage provider to a content provider and content delivery network.

With reference to FIG. 4, an illustrative interaction for generation and processing of one or more requests corresponding to one or more embedded resources from a network computing and storage provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing and storage provider 107. For example, the network computing and storage provider may check if an embedded resource is stored in a local cache or in another server or service provider associated with the network computing and storage provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
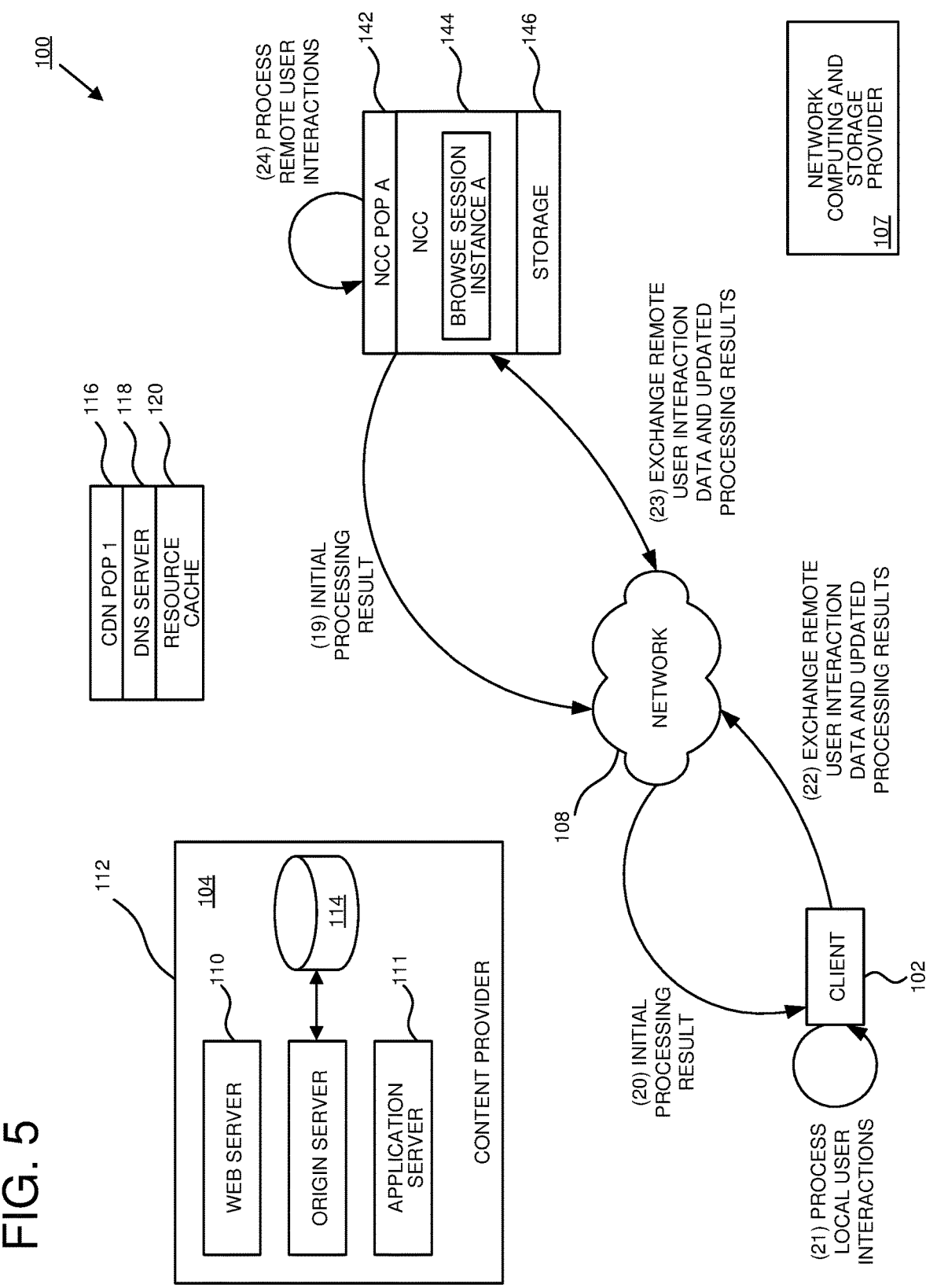
FIG. 5 is a block diagram of the content delivery environment of FIG. 1 illustrating the generation and processing of browse session data and user interaction data between a network computing and storage provider and client computing device.

With reference to FIG. 5, an illustrative interaction for generation and processing of processing results and user interaction data between a network computing and storage provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing and storage provider 107. The network computing and storage provider 107 may provide updated processing results to the client computing device in response to changes to the content or remote user interaction data from the client computing device.

Figure 6:
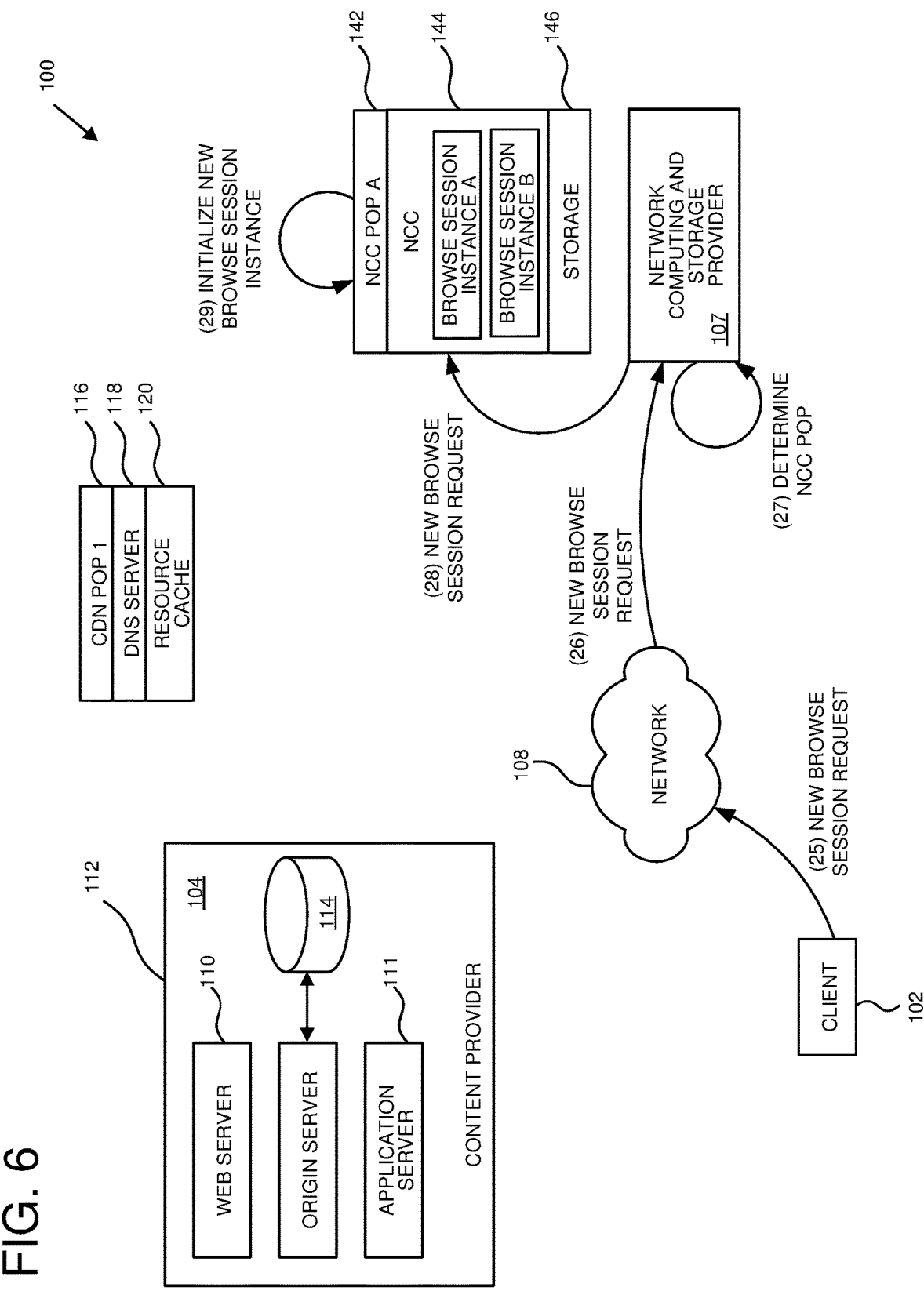
FIG. 6 is a block diagram of the content delivery environment of FIG. 1 illustrating the generation and processing of an additional new browse session request from a client computing device to a network computing and storage provider.

With reference to FIG. 6, a block diagram of the content delivery environment of FIG. 1 illustrating the generation and processing of an additional new browse session request from a client computing device to a network computing and storage provider is disclosed. As illustrated in FIG. 6, a second new browse session request may be sent to network computing and storage provider 107 from client computing device 102 across network 108. In an illustrative embodiment, the network computing and storage provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing and storage provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing and storage provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing and storage provider 107 may select an associated network computing component such as NCC POP 142 to service the browse session request. As discussed above with reference to FIG. 2, a network computing and storage provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing and storage provider 107 may select a number of NCC POPs to service a browse session request. Illustratively, although the network computing and storage provider 107 is depicted here for purposes of illustration as selecting NCC POP 142, the network computing and storage provider 107 may select any extant NCC POP to service the browse session request. For example, a single client computing device 102 may simultaneously or sequentially provide three different browse session requests to the network computing and storage provider 107 corresponding to different network resources. The network computing and storage provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
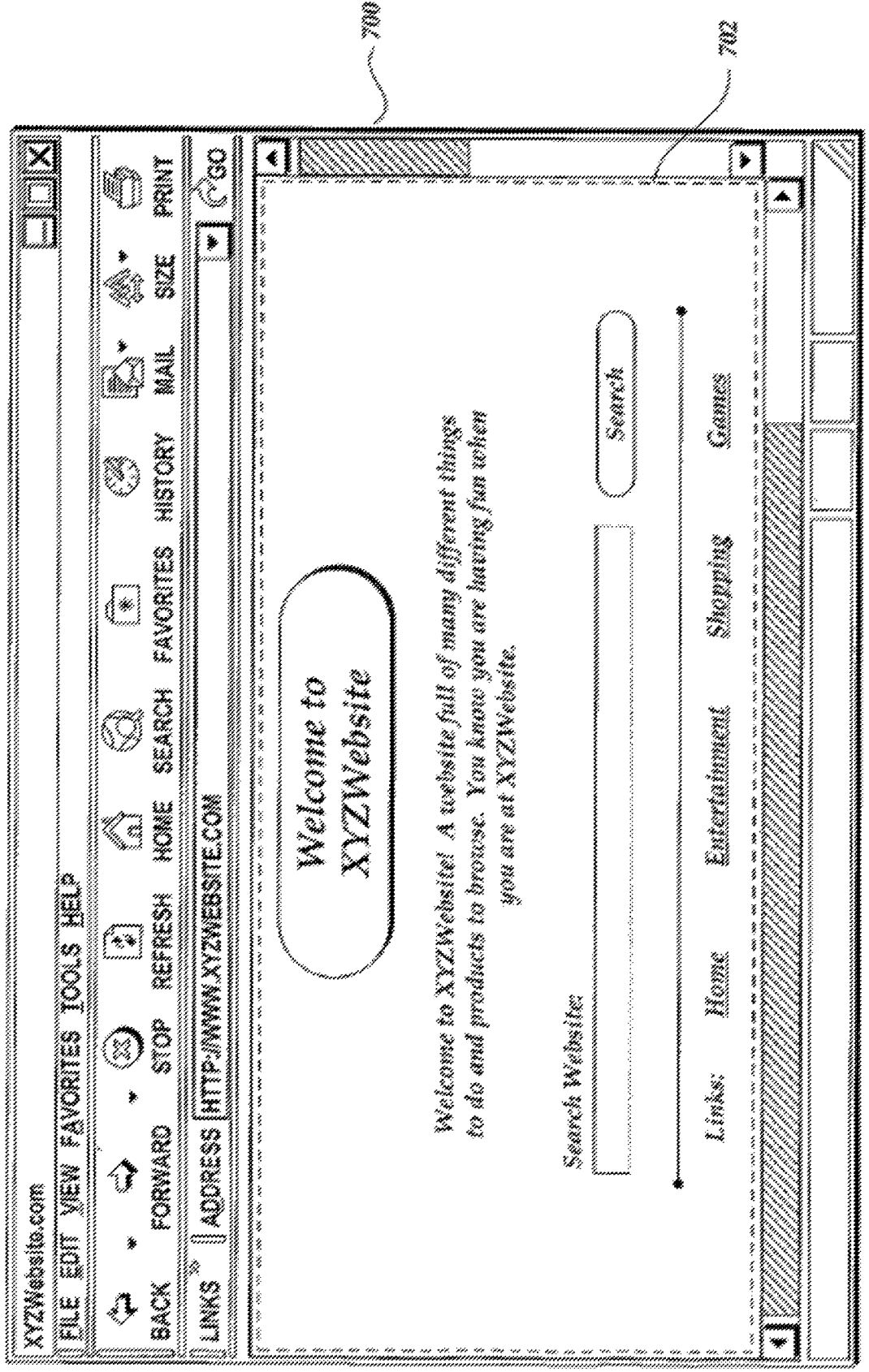
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
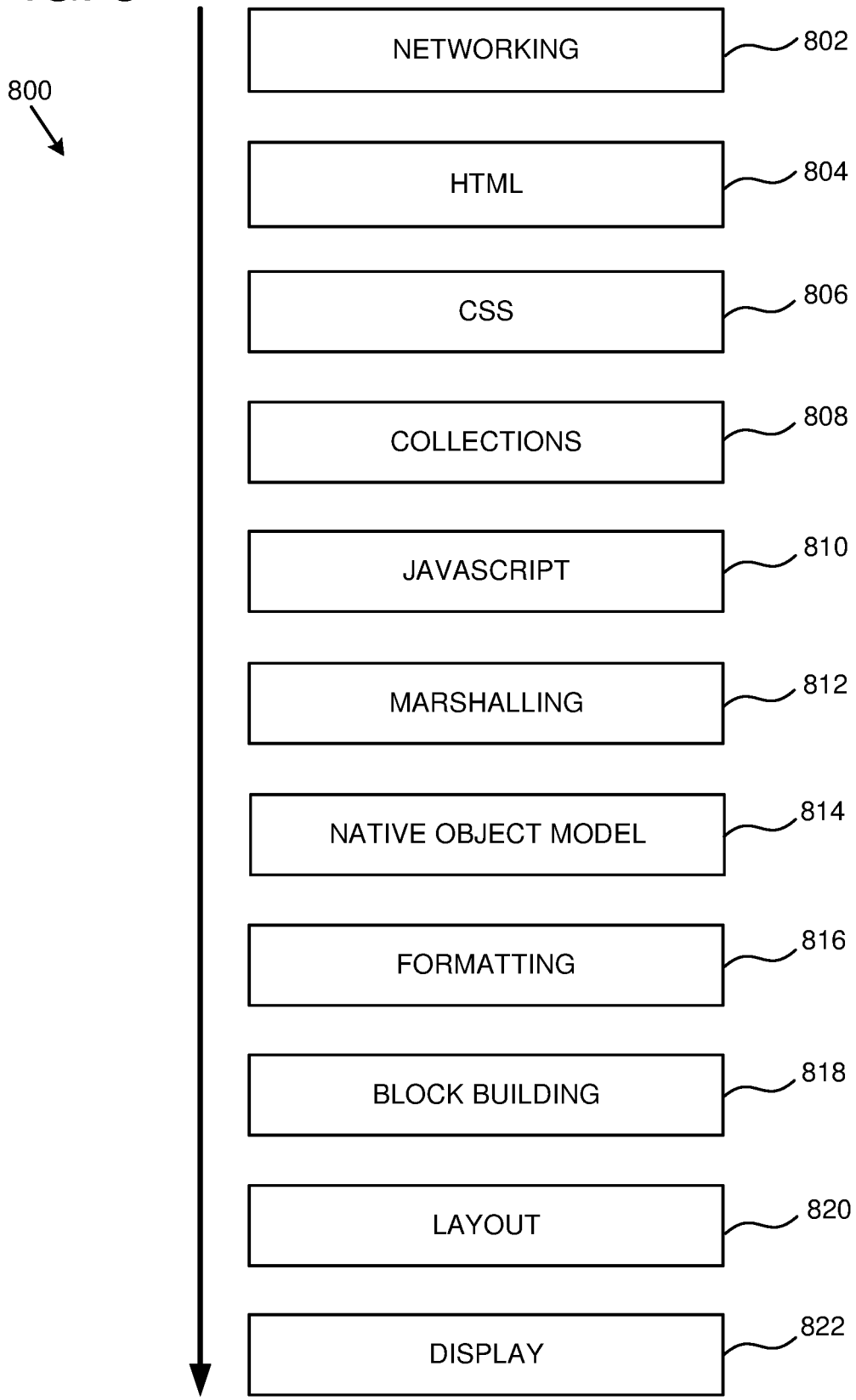
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions (processing operations). Illustratively, and as described above with reference to FIGS. 3-5, a remote session browsing configuration may specify a split between processing actions performed at a network computing and storage provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing and storage provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
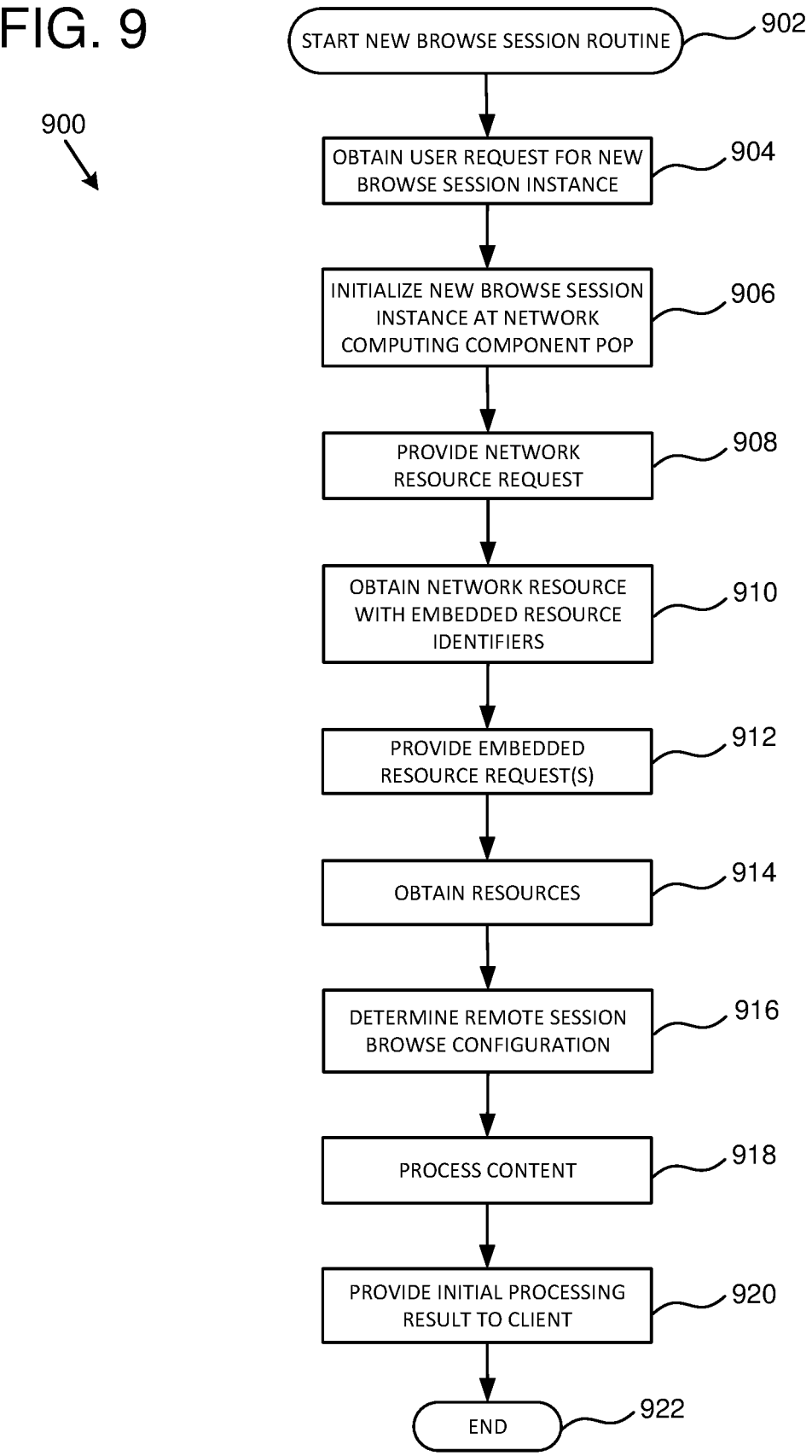
FIG. 9 is a flow diagram illustrative of a new browse session routine implemented by network computing and storage provider.

FIG. 9 is a flow diagram illustrative of a new browse session routine 900 implemented by network computing and storage provider 107 of FIG. 1. New browse session routine 900 begins at block 902. At block 904, the network computing and storage provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing and storage provider 107 may select an associated NCC POP to instantiate a new browse session based on the browse session request. As discussed above with reference to FIG. 1, a network computing and storage provider 107 may include any number of NCC POPs distributed across any number of physical or logical locations. A network computing and storage provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing and storage provider 107 may select a number of NCC POPs to service a browse session request. For example, the network computing and storage provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing and storage provider 107, NCC POP 142 may obtain the browse session request. In one embodiment, NCC POP 142 may have the browse session request forwarded to it by a component of network computing and storage provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing and storage provider 107, may be provided with a subset of information (e.g., just a network address of requested content), or may be provided additional information not included in the original browse session request.

Subsequent to the NCC POP 142 being selected, the network computing and storage provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing and storage provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing and storage provider or NCC POP 142 may instantiate any number of new virtual machine instances and/or browser instances (or make use of existing instantiated instances) based on a single browse session request.

At block 908 the network computing and storage provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing and storage provider 107. One of skill in the art will appreciate that, in the case of other embodiments, the link or network address may correspond to a document or file stored in a digital file locker or other network storage location or at a cache component associated with the network computing and storage provider 107 or client computing device 102. In some embodiments, the new session request may include a document or file in addition to or as an alternative to a network address. At block 910, the network computing and storage provider 107 obtains the one or more network resources. Subsequent to obtaining the requested network resource, the NCC POP 142 may process the network resource to extract embedded resource identifiers.

At block 912, the network computing and storage provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing and storage provider 107 may obtain these embedded resources from any number of different sources, sequentially or in parallel.

At block 916, the network computing and storage provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing and storage provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of a piece of network content be performed at the remote computing device, such as the NCC POP 142, rather than at the client computing device 102. Network content partially (or wholly) processed at the network computing and storage provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing and storage provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing and storage provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing and storage provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing and storage provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing and storage provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instances executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing and storage provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing and storage provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing and storage provider 107 may instantiate a browse session instance running on a first NCC POP and utilizing an RDP protocol as well as browse session instance running on a second NCC POP utilizing an X-Windows protocol. The client computing device 102 or the network computing and storage provider 107 may determine which browse session instance and protocol should be used based on performance or resource usage considerations as described with regards to determining a remote session browse protocol above.

With continued reference to FIG. 9, at block 918, the network computing and storage provider 107 may process the obtained content, including the one or more requested network resources and embedded network resources, according to the determined remote session browsing configuration to generate an initial processing result. At block 920, the network computing and storage provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
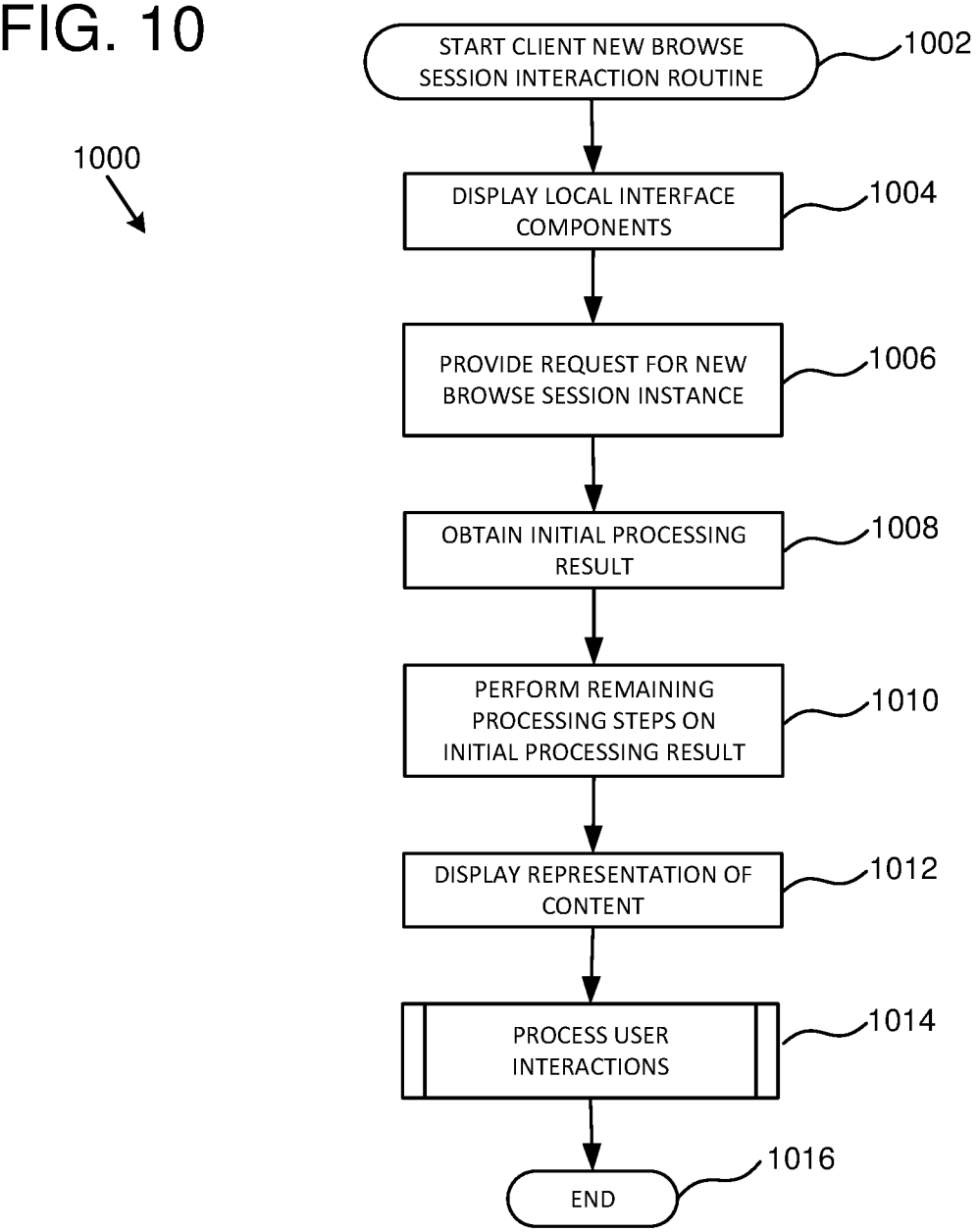
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing and storage provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing and storage provider 107. In an illustrative embodiment, the network computing and storage provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing and storage provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing and storage provider receiving a request for a new browse session instance at block 904 of FIG. 9 above.

At block 1008, the client computing device 102 obtains an initial processing result from the network computing and storage provider 107. Illustratively, the format and data included in the initial processing result may vary based on the remote session browsing configuration selected by the network computing and storage provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing and storage provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
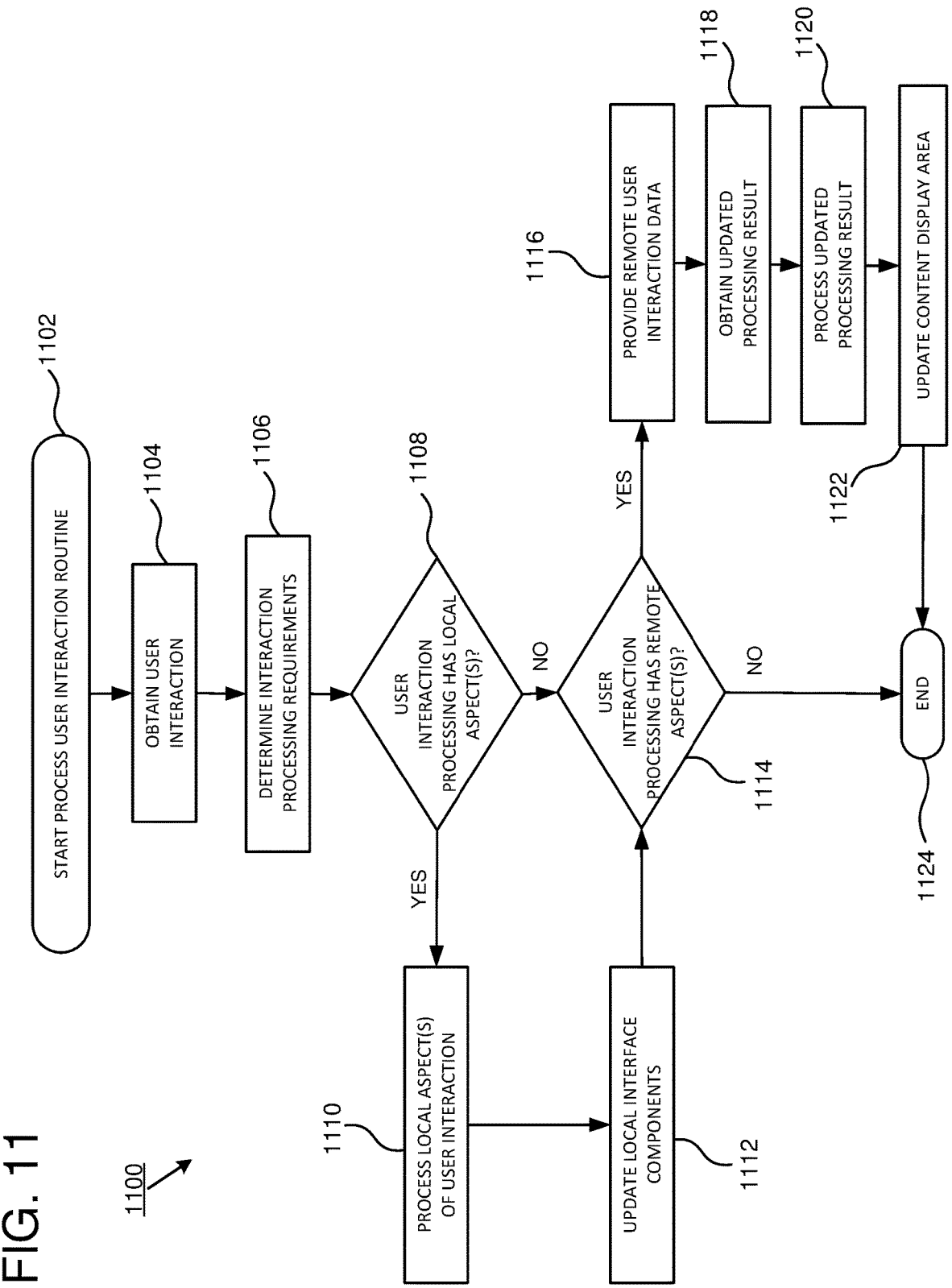
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing and storage provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing and storage provider 107 on a continuous basis, while in other embodiments of remote session browse configurations remote user interaction data may only be provided to the network computing and storage provider 107 when associated with a user interaction that requires remote processing.

At block 1118, the client computing device 102 obtains an updated processing result from the network computing and storage provider 107, the network computing and storage provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

In some embodiments, technologies are provided for determining valuation of web pages and/or portions of web pages (e.g., in terms of a weight or value) based on the content of the web pages and/or portions of the web pages. For example, a web page can be decomposed into web page content components (e.g., the different content areas of the web page can be identified). The decomposition can be performed by obtaining web page content information for the web page (e.g., by just obtaining layout information, such as HTML, for the web page without obtaining the remaining web page resources, such as the actual text, images, videos, CSS resources, JavaScript resources, and other web page resources). The web page content components can then be weighted according to content type. Instead of, or in addition to, content type, weighting can be performed based on other criteria, such as past browsing history (e.g., user-specific browsing history and/or aggregate browsing history related to a number of users). Decisions can be made based on the web page weight (e.g., based on an overall weight of the web page). For example, a web page with a high weight (e.g., a weight over a threshold, a high weight relative to other web pages, etc.) can be pre-fetched and/or pre-cached (e.g., at a server environment and/or at a client device) in advance of the page being selected by the user. Web pages or web page content components can also be ordered based on weight for sending to a client device.

For example, a web page that contains relevant text and images as well as advertisements can be decomposed into content components including a relevant text content component, a relevant image content component, and an advertisement content component and weighted accordingly. Web page resources for the highest weighted components can be sent first to the client device (e.g., web page resources for the relevant text and image content components), which can provide a quicker page load for the relevant content and an improved user experience (e.g., the user can be presented with the content that the user is interested in quickly with the remaining content, such as advertisements, loaded later).

A weight refers to an indication of the value of a web page and/or a portion of a web page (e.g., a web page content component) based on the content of the web and/or portion of the web page. A weight can be a numerical value (e.g., positive and/or negative numbers) or an indication of value (e.g., high, medium, and low). Weights can be used for ordering web pages or content components (e.g., an order of web pages from highest value to lowest value).

Figure 12:
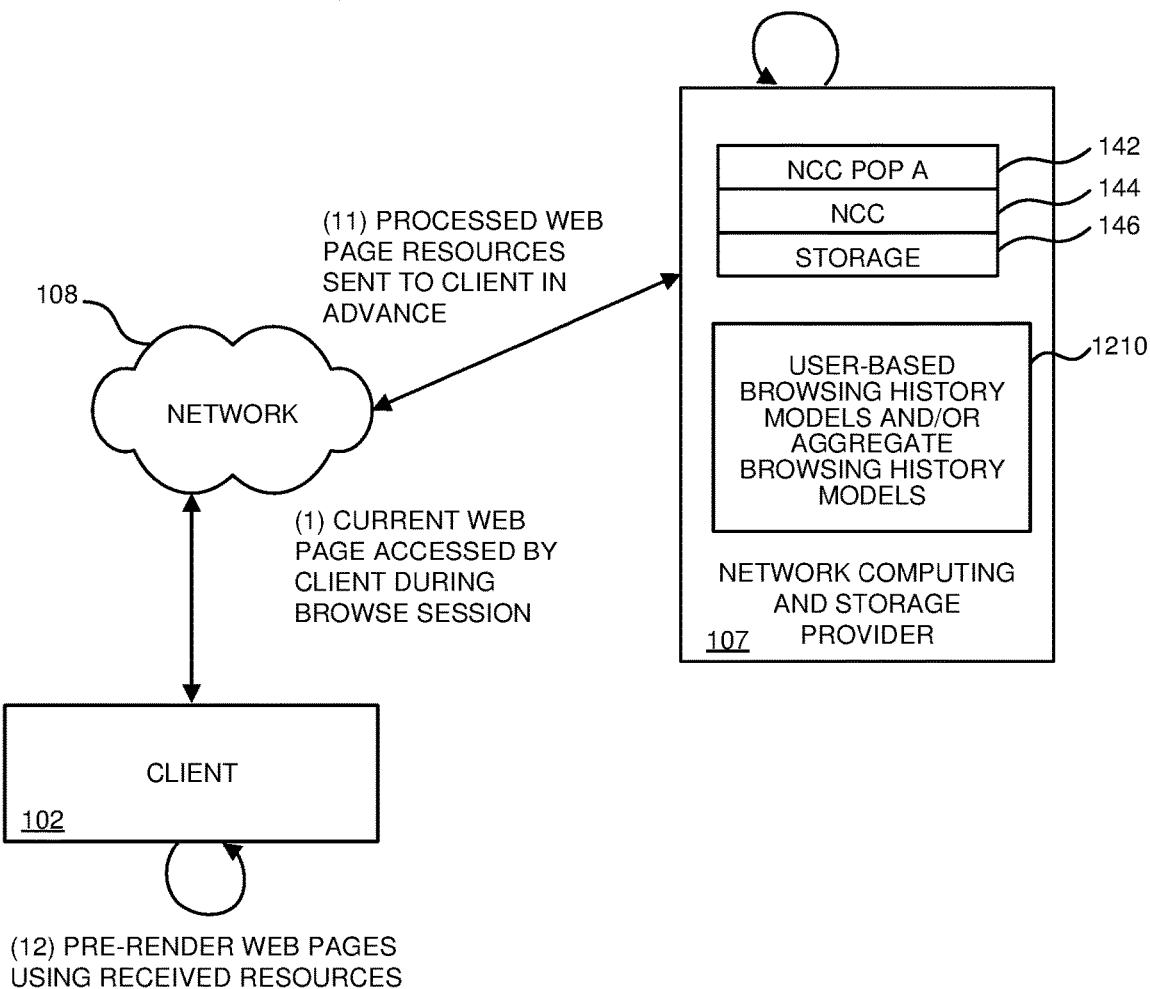
FIG. 12 is a block diagram of the content delivery environment of FIG. 1 in which web page valuation is performed.

With reference now to FIG. 12, the interaction between various components of the networked computing environment 100 of FIG. 1 will be discussed in the context of measuring the value of web pages.

FIG. 12 is a block diagram 1200 of the content delivery environment of FIG. 1 in which web page valuation is performed. As depicted in the diagram 1200, a client computing device 102 can communicate with network computing and storage provider 107 via the network 108. Specifically, the client computing device 102 can perform content browsing activities (e.g., web browsing activities), in association with the network computing and storage provider 107. While only one client computing device 102 is depicted, the environment supports multiple client computing devices.

In some embodiments, the network computing and storage provider 107 performs web page valuation activities during a browse session. For example, the client computing device 102 can browse a current web page during a browse session. The current web page can have a number of links to other web pages. The network computing and storage provider 107 can evaluate the other web pages and/or portions of the other web pages to determine which pages and/or which portions of the pages to obtain in advance (e.g., before a user of the client computing device 102 selects any of the other web pages).

In some embodiments, the network computing and storage provider 107 performs a number of operations for each web page linked within the current web page. The operations can include obtaining web page content information (e.g., only HTML information is some implementations) describing the content layout for the web page and then decomposing the web page into web page content components. The operations can further include determining a content type for each content component (e.g., content types such as: news article, navigation, advertisement, image, video, etc.) and determining a weight for each content component based on the content type and/or other criteria. For example, certain content types can be weighted higher than others (e.g., news articles can be valued higher than advertisements). Weighting can also take into account browsing history of the user that is accessing the current web page (e.g., weighting can take into consideration content types that the user frequently accesses based on the user's browsing history). Weighting can also take into account aggregate browsing history from other users (e.g., the types of content that other users frequently access). The browsing history can be determined based on history models 1210 stored at the network computing and storage provider 107. The network computing and storage provider 107 next selects one or more of the web pages to obtain in advance based on the weights (e.g., based on a threshold weight, based on the top N web sites by weight, etc.). For the web pages that are obtained in advance, the network computing and storage provider 107 obtains web page resources (e.g., text, images, videos, CSS information, JavaScript code, and/or other resources needed for rendering or displaying the web page), processes the web page resources (e.g., performing some rendering pipeline operations which may include creating a DOM, creating processed layers, etc.) and sends the processed web page resources to the client computing device 102 in advance. The client computing device 102 can store the web page resources or further process them (e.g., create pre-rendered pages in an off-screen buffer so that they are ready for immediate display if the user selects a corresponding link).

The operations described with regard to the network computing and storage provider 107 and the client computing device 102 can also be performed to obtain individual content components in advance. For example, the highest weighted web page content components across a group of web pages can be obtained in advance and stored at the network computing and storage provider 107 or sent to the client computing device 102 (e.g., for pre-rendering at the client).

Figure 13:
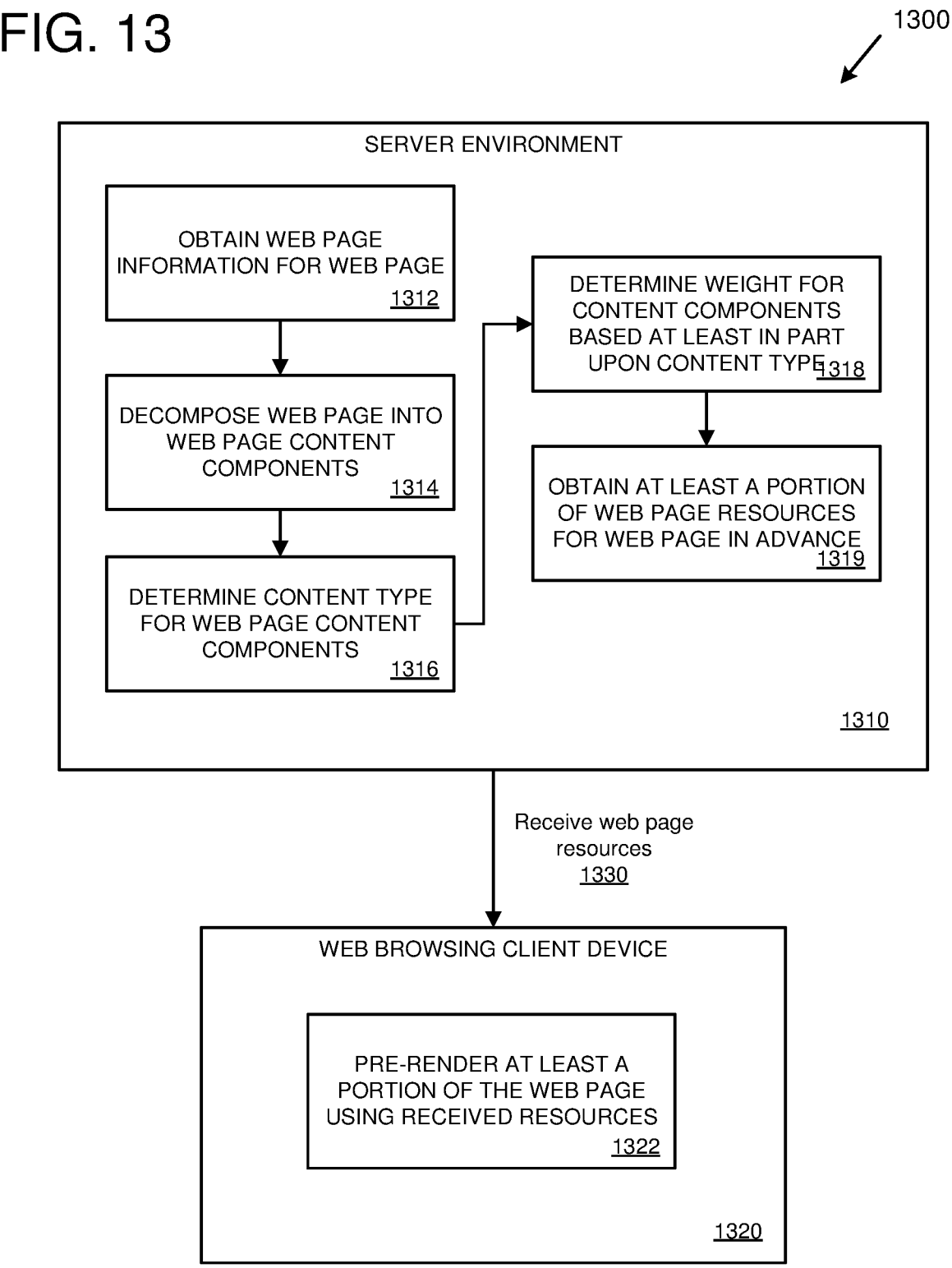
FIG. 13 is a block diagram depicting an example environment in which web page valuation is performed.

FIG. 13 is a block diagram 1300 of an example environment within which web page valuation is performed. The example environment includes a server environment 1310 (e.g., a cloud-based or network-based web browsing environment operated by one or more computer servers, such as a network computing and storage provider). The server environment 1310 can provide web page browsing services to client devices, including client device 1320.

In some embodiments, the server environment 1310 performs operations supporting web page valuation, including the operations depicted at 1312 through 1319. At 1312, the server environment 1310 obtains web page information for a web page. The web page information describes how the content of the web page is structured (e.g., how the content of the web page is divided into various content areas). In some implementations, the web page information is the HTML for the web page (e.g., only the HTML for the web page).

At 1314, the server environment 1310 decomposes the web page (based on the web page information obtained at 1312) into web page content components. Each web page content component represents a separate content area of the web page. For example, a web page may be decomposed into content components such as: a top navigation area, a text area, an image area, an advertisement area, and a bottom link area.

At 1316, the server environment 1310 determines content types for the web page content components (e.g., a specific content type for each web page content component). For example, a content component representing an area that contains advertisements (e.g., advertising images, videos, text, etc.) can be assigned an "advertising" content type. A content component representing an area that contains a news article can be assigned a "news article" content type. The content type can be determined, for example, by examining a link associated with the web page content component (e.g., if the content component is retrieved from an advertising server domain such as doubleclick.net, then the content component can be identified as an advertising content component). The content type can also indicate whether the component is "related" or "unrelated" to the web page and/or to the link from which the web page was accessed. For example, a current web page could contain a link to a web page containing a news article about the U.S. economy. The web page containing the news article can then be obtained (e.g., as indicated at 1312) and decomposed (e.g., as indicated at 1314). One of the content components of the news article web page can be the news article about the U.S. economy (e.g., one component with text and images, or multiple components such as a content component comprising the text of the article and another content component comprising images for the article). The news article component (or components) can be assigned a type of "related article". Other components of the news article page may be related or unrelated. For example, related components could include links to other news articles on the U.S. economy or links to other videos on the U.S. economy. Unrelated components could include advertisements (e.g., which may be considered by default to be unrelated), unrelated images, unrelated text, unrelated links, navigation components (e.g., which may be considered by default to be unrelated), etc.

At 1318, the web page content components are weighted based at least in part upon the content types determined at 1316. For example, content components can be weighted based on whether the content is advertising content vs. non-advertising content. The content components can also be weighted based on whether a given component is "related" or not (e.g., related content components can be weighted higher than non-related content components).

In some situations (e.g., when the web page weight is over a threshold or the web page is rated high relative to other web pages), at least a portion of web page resources are obtained in advance, as indicated at 1319. In some implementations, the weights of the content components are combined to calculate an overall weight of the web page (e.g., to determine whether to obtain web page resources for the entire web page in advance). In some implementations, the weights of the content components are utilized individually or in groups (e.g., to identify content components, or groups of content components, for which web page resources will be obtained in advance). The web page resources that are obtained advanced can be processed (e.g., turned in to processed layers or bitmap images). The web page resources can be stored (e.g., in an original state or a processed state) at the server environment 1310. The web page resources (e.g., in an original state or a processed state) can be sent to the client device 1320.

The client device 1320 can receive the web page resources (e.g., in an original state or a processed state), as indicated at 1330. The client device 1320 can store the received web page resources. The client device 1320 can also pre-render at least a portion of the web page using the received web page resources, as indicated at 1322 (e.g., pre-render in an off-screen buffer at the client device 1320 for immediate display if selected by the user).

For example, if a current web page has 10 links to other web pages, web page information for the 10 other web pages can be obtained (e.g., as indicated at 1312) and the highest weighted web pages of the 10 other web pages (e.g., the top 3 web pages) can be pre-fetched and/or pre-rendered in advance of being selected by the user. For example, web page resources for the top 3 web pages can be obtained in advance and stored at the server environment (e.g., at server environment 1310) or sent to the client device (e.g., to client device 1320 for storage or pre-rendering).

In some embodiments, the server environment (e.g., server environment 1310) performs web page valuation operations outside the context of a user browse session or outside the context of a current web page the user is viewing (e.g., asynchronously with regards to the user's browsing activity). For example, the server environment can perform operations (e.g., 1312, 1314, 1316, 1318, and/or 1319) to value web pages at times other than when a user is accessing a current web page with links to the web pages to be valued. For example, the server environment can predict which web pages a user is likely to visit in the future (e.g., based on user-specific prediction models) and value those pages (e.g., for pre-fetching and/or pre-rendering pages with a high weight).

In some embodiments, the server environment (e.g., server environment 1310) updates user-specific and/or aggregate browsing history on a dynamic basis. For example, the server environment can receive a user-selection of a content component and update information related to the content component in the user's browsing history (e.g., part of the user's profile) and/or in aggregate browsing history. For example, if a user selects a content component with a particular content type, weighting for the particular content type that is specific to the user (a user-specific weight for the content type) can be updated and stored within the user's browsing history (e.g., dynamically during web browsing activity, which may cause weights of content components and/or web pages to be updated in real-time or near real-time).

Figure 14:
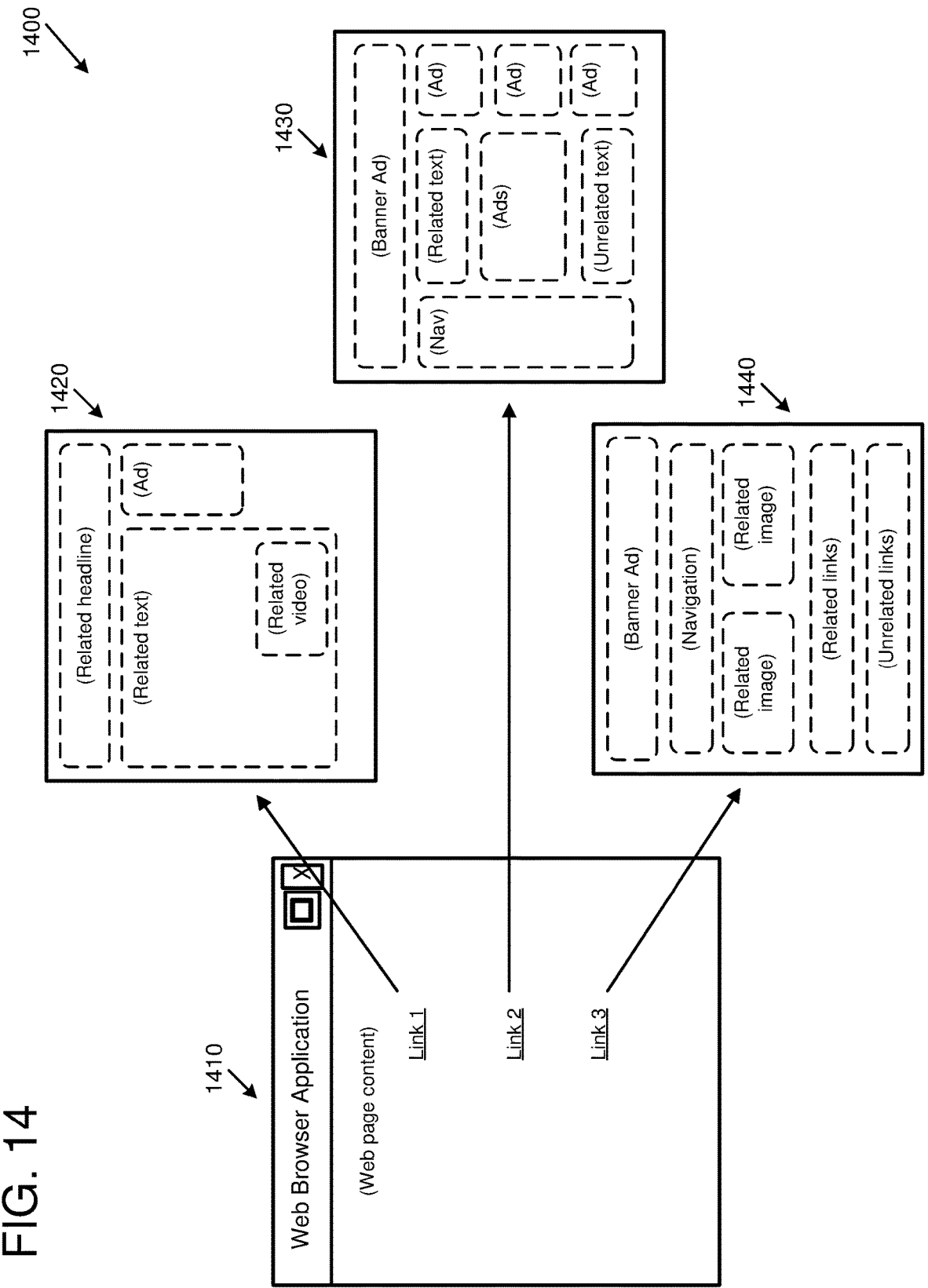
FIG. 14 is a diagram depicting an example web page valuation scenario.

FIG. 14 is a diagram depicting an example web page valuation scenario 1400. In the example scenario 1400, a current web page 1410 is being accessed (e.g., being accessed by a user via a web browser application running on a client computing device, such as a mobile phone, tablet, laptop, desktop, or another type of computing device). The current web page 1410 contains a number of links to other web pages, including link 1, link 2, and link 3. The links to other web pages can be links associated with text content (e.g., a news article title that links to another web page), image content, video content, or other types of web content. While the example current web page 1410 depicts three links, other web pages may contain more, or fewer, links.

In the example scenario 1400, an example web page is depicted for each of the three links (link 1 references example web page 1420, link 2 references example web page 1430, and link 3 references example web page 1440). Example web page content components are depicted for each of the example web pages. For example, a server environment (e.g., server environment 1310) can obtain web page information for the web page 1420 (e.g., obtain HTML for web page 1420) and decompose the web page into its web page content components. For example, web page 1420 includes a web page content component for a related headline (e.g., text or image content that is related to the link), related text, a related video, and an unrelated advertisement.

Using the web page content components, the web pages (or portions of the web pages) can be valued. Taking web page 1420 as an example, the related headline, related text, and related video content components may be weighted high because they are related to the subject of the link (e.g., the first link may be a link to a news article, and the headline, text, and video may be related to the news article), while the advertisement may be weighted low (e.g., a low number, a negative number, or zero) because it is unrelated to the subject of the link and/or because it is an advertisement.

Valuation of a web page can be performed using numeric weights. As an example, the web page content components of web page 1420 could be valued as follows:
  related text component: 20
  related video component: 20
  related headline component: 10
  advertising component: 0
Using these example weights, the overall weight of the web page 1420 can be calculated as: 20+20+10+0=50. The web page content components of web page 1430 could be valued as follows:
  related text component: 20
  unrelated text component: 5
  navigation component: 0
  advertisements and banner advertisement components: 0
Using these example weights, the overall weight of the web page 1430 can be calculated as: 20+5+0+0=25. The web page content components of web page 1440 could be valued as follows:
  related image components: 15 each
  related links component: 5
  unrelated links component: 3
  navigation component: 0
  banner advertisement component: 0
Using these example weights, the overall weight of the web page 1440 can be calculated as: 15+15+5+3=38. Using the overall weights, the web pages can be ordered from highest weight to lowest weight as: web page 1420 (weight of 50), web page 1440 (weight of 38), and web page 1430 (weight of 25). Using the overall weights, one or more web pages can be selected for pre-fetching and/or pre-rendering in advance (e.g., web page resources for the highest weight web page 1420 can be obtained in advance). Web page resources can also be obtained on an individual content component basis. For example, the highest weight content components among a group of web pages can be pre-fetched and/or pre-rendered. For example, if the top 5 content components are to be pre-rendered using the example weights described above, then web page resources for the following content components would be obtained: the related text and related video components of web page 1420, the related text component of web page 1430, and the two related image components of web page 1440.

Valuation of a web page can be performed using indications of relative weight (e.g., labels such as "high," "medium," and "low"). Indications of relative weight can be based on the presence, or number, of specific types of content components on the page. For example, a page such as 1420 with three related content components may be assigned a "high" weight while a page such as 1430 with only one related content component may be assigned a "low" weight.

Weighting of content components can also be performed based on other attributes of the content components. For example, the size of the content component (e.g., as a percentage display area of a web page or as a relative area compared to other components) can influence the assigned weight. As a specific example, the related text content component of web page 1420 covers a relatively large percentage of the web page and therefore may be given a higher weight than the related text content component of web page 1430. Other characteristics of the content component can be considered in addition to, or instead of, display size. For example, the position or location of the content component can be considered (e.g., a content component that is located at the top of the web page may be weighted higher than one at the bottom). As another example, the visibility of the content component can be considered (e.g., a content component that is visible on the web page when it is loaded, without having to scroll down, may be weighted higher).

Weighting of content components can also be performed based on browsing history of the user accessing a current web page and/or based on browsing history of other users (e.g., aggregate browsing history generated from a number of users). Browsing history can be used to indicate which web page content components are of particular interest or frequently accessed by the current user and/or by other users in general. Frequently accessed web page content components can be weighted higher (e.g., because they are more likely to be selected). Browsing history can indicate frequently-accessed web page content components based on content type. For example, the browsing history associated with a particular user can indicate that the particular user frequently accesses news articles and as a result content components with a news article content type can be weighted higher. As another example, the browsing history associated with a particular user can indicate that the particular user frequently views advertisements and as a result content components with an advertising content type can be weighted higher (e.g., weighted higher than a default value for advertising content, weighted higher than other users that don't often view advertising content, etc.).

Figure 15:
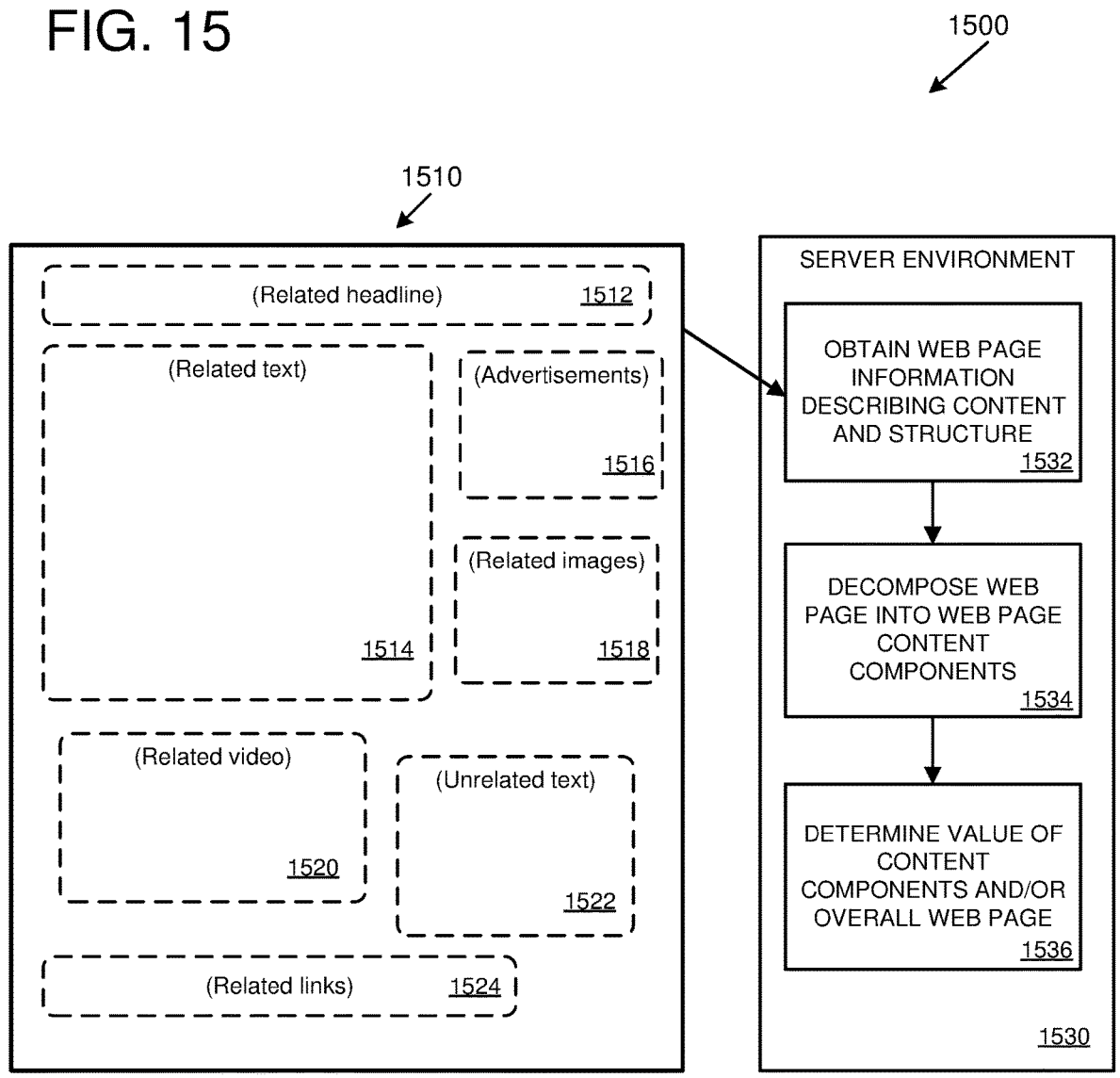
FIG. 15 is a diagram depicting example operations for performing web page valuation.

FIG. 15 is a diagram 1500 depicting operations that are performed to determine the value of an example web page 1510. In the diagram 1500, a server environment 1530 is depicted. The server environment 1530 obtains web page content information (e.g., HTML) describing the content structure of the example web page 1510, as indicated at 1532. Using the web page content information, the server environment 1530 decomposes the web page into web page content components, as indicated at 1534. The web page content components for the example web page 1510 are depicted at 1512, 1514, 1516, 1518, 1520, 1522, and 1524.

The server environment 1534 then determines the value of the content components and/or the overall example web page 1510, as indicated at 1536. For example, a weight can be assigned to each of the content components and the weights can be summed to calculate an overall weight for the example web page 1510.

Figure 16:
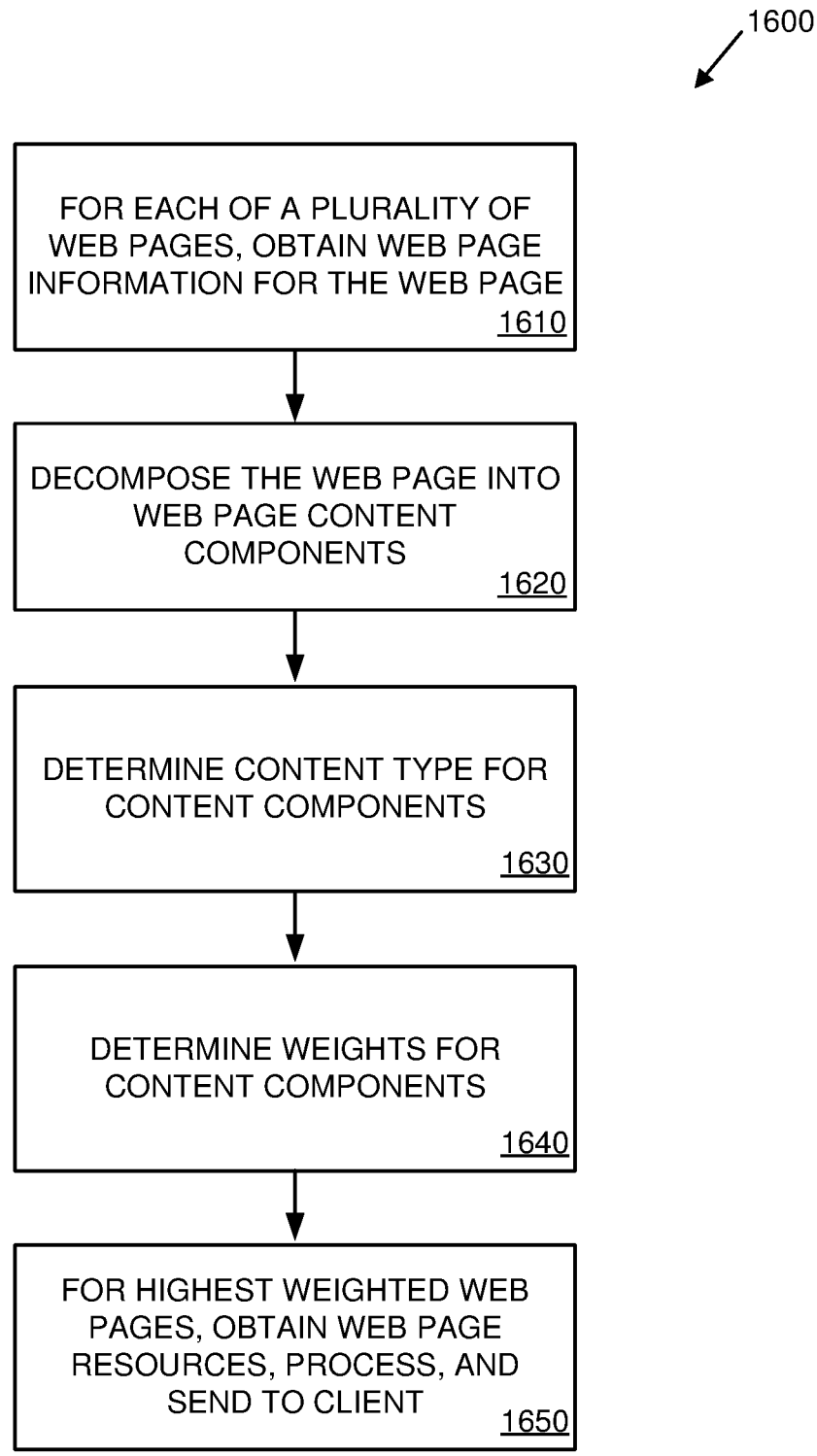
FIGS. 16, 17, and 18 are flow charts of example methods for determining web page value.

FIG. 16 is a flow chart of an example method 1600 for determining web page value (measuring web page value). For example, the example method 1600 can be performed by the network computing and storage provider 107 described above with regard to FIG. 12 or the server environment 1310 described above with regard to FIG. 13.

At 1610, web page content information is obtained for each of a plurality of web pages. The plurality of web pages can be referenced by links on a current web page being accessed by a user (e.g., during a browse session). The web page content information can be HTML. In some implementations, the HTML for the web page is obtained (e.g., only the HTML) without obtaining other web page resources (e.g., images, videos, CSS information, code, etc.).

At 1620, each of the web pages is decomposed into web page content components using the web page content information received at 1610. The decomposition can be performed by examining the HTML and identifying the various content components of the web page.

At 1630, content types are determined for each of the content components. Content types can be determined, at least in part, by examining links associated with the content components.

At 1640 a weight is assigned to each of the web page content components. The weight can be assigned based on the content type, based on user-specific and/or aggregate browsing history, and/or based on other criteria.

At 1650, web page resources for the highest weighted web pages are obtained in advance. For example, the top N web pages according to weight can be selected from the plurality of web pages for obtaining in advance. The web page resources that are obtained in advance can be stored (e.g., at a server environment) for providing to a client device upon request. The web page resources that are obtained in advance can be processed (e.g., to produced processed layers or bitmap images) and provided to a client device (e.g., for pre-rendering at the client device).

Figure 17:
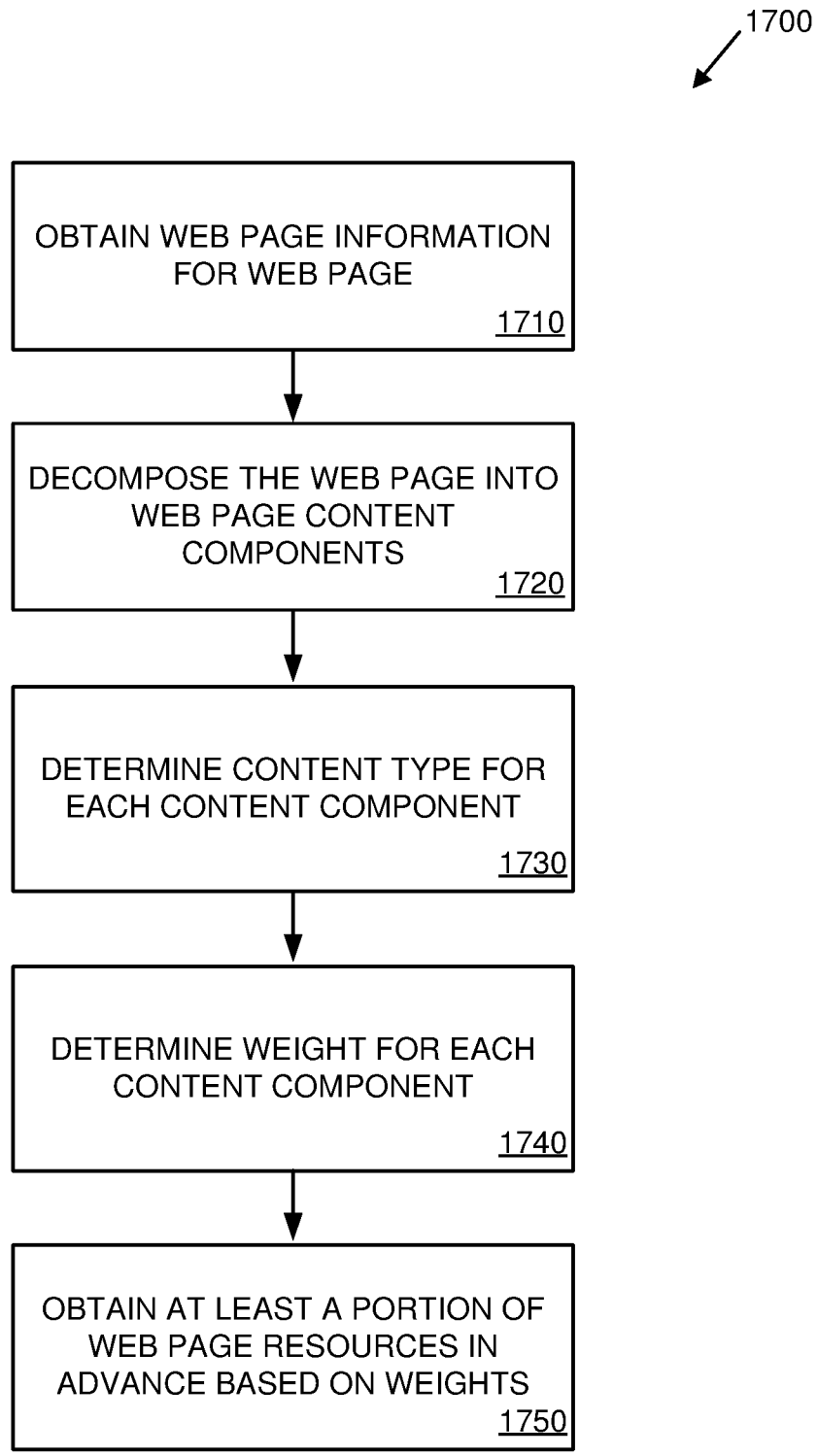

FIG. 17 is a flow chart of an example method 1700 for determining web page value. For example, the example method 1700 can be performed by the network computing and storage provider 107 described above with regard to FIG. 12 or the server environment 1310 described above with regard to FIG. 13.

At 1710, web page content information is obtained for a web page. The web page can be referenced by a link on a current web page being accessed by a user (e.g., during a browse session). The web page content information can be HTML. In some implementations, the HTML for the web page is obtained (e.g., only the HTML) without obtaining other web page resources (e.g., images, videos, CSS information, code, etc.).

At 1720, the web page is decomposed into web page content components using the web page content information received at 1710. The decomposition can be performed by examining the HTML and identifying the various content components (e.g., content areas) of the web page.

At 1730, a content type is determined for each of the content components. Example content types include a navigation content type (e.g., for navigation menus), a text content type (e.g., a news article or other text information), and an advertisement content type. Content types can be determined, at least in part, by examining links associated with the content components.

At 1740 a weight is assigned to each of the web page content components. The weight can be assigned based on the content type, based on user-specific and/or aggregate browsing history, and/or based on other criteria.

At 1750, a least a portion of the web page resources for the web page are obtained in advance based on the weights of the web page content components. In some implementations, the entire web page can be obtained in advance by obtaining all of the web page resources for the web page (e.g., which may be processed and sent to the client device for pre-rendering). In some implementations, web page resources for only some of the content components are obtained in advance (e.g., only those content components with a weight over a threshold value).

Figure 18:
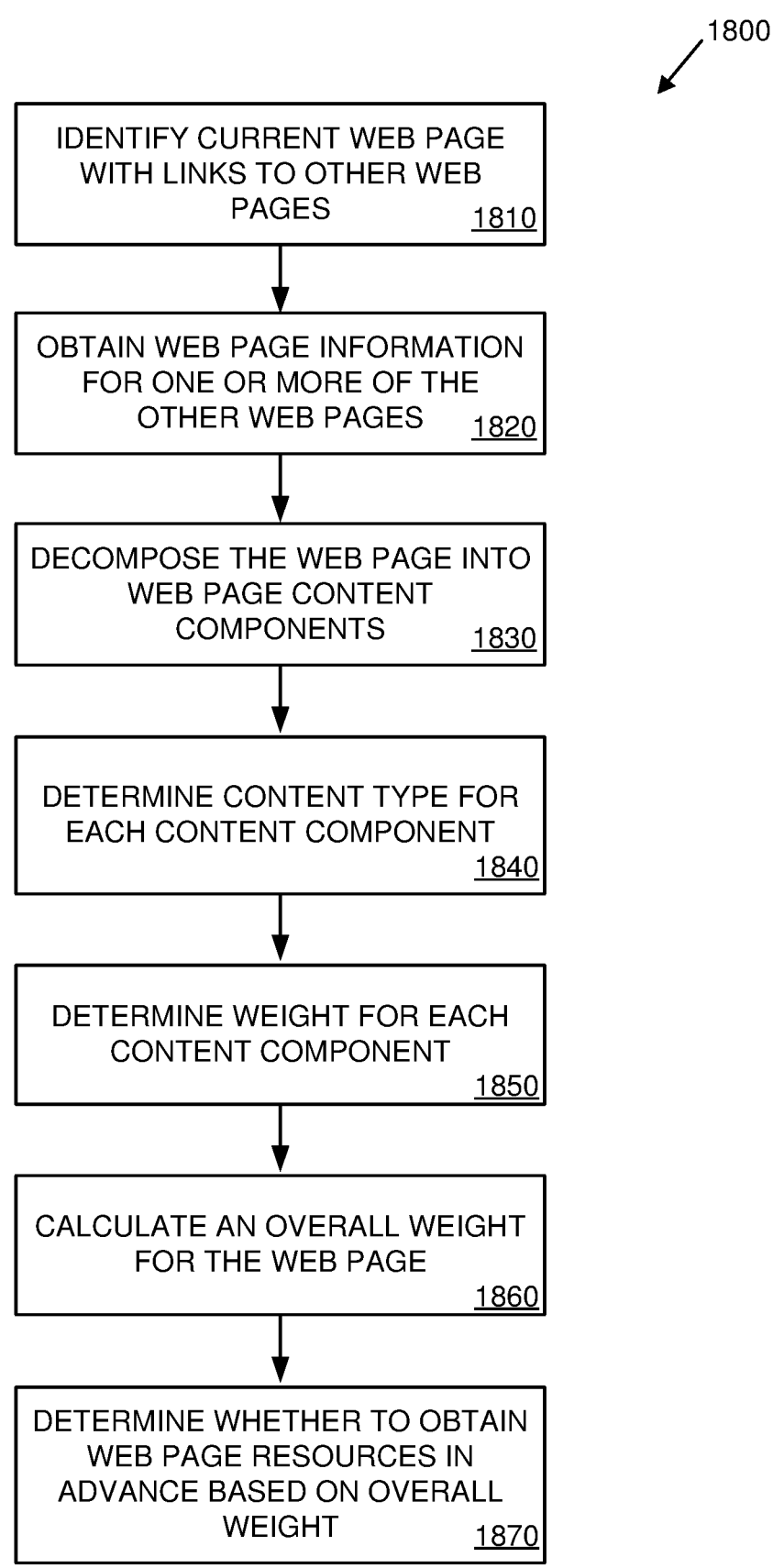

FIG. 18 is a flow chart of an example method 1800 for determining web page value. For example, the example method 1800 can be performed by the network computing and storage provider 107 described above with regard to FIG. 12 or the server environment 1310 described above with regard to FIG. 13.

At 1810, a current web page is identified with links to other web page. For example, the current web page can be accessed by a user during a browse session.

At 1820, web page content information is obtained for one or more of the other web pages linked from the current page. The web page content information can be HTML. In some implementations, the HTML for a given web page is obtained (e.g., only the HTML) without obtaining other web page resources (e.g., images, videos, CSS information, code, etc.).

At 1830, each of the one or more web pages is decomposed into web page content components using the web page content information received at 1820. The decomposition can be performed by examining the HTML and identifying the various content components (e.g., content areas) of the web page.

At 1840, a content type is determined for each of the content components. Content types can be determined, at least in part, by examining links associated with the content components.

At 1850 a weight is assigned to each of the web page content components. The weight can be assigned based on the content type, based on user-specific and/or aggregate browsing history, and/or based on other criteria.

At 1860, an overall weight is calculated for each of the one or more web pages. The overall weight for a given web page can be calculated by summing the weights of the content components of the given web page.

At 1870, a determination is made as to whether web page resources will be obtained for each of the one or more web pages. The determination is based on the overall weight of each of the one or more web pages. For example, the one or more web pages can be ordered from highest overall weight to lowest overall weight and the top N can be selected. As another example, a given web page that has an overall weight over a threshold value can be selected. For the selected web pages, web page resources can be obtained in advance and pre-cached or pre-rendered.

In some embodiments, a recommendation is provided to a client device based on the weights instead of, or in addition to, obtaining web page resources in advance. For example, a recommendation can be determined for content components and/or web pages based on their corresponding weights. For example, highly weighted content components and/or web pages can be recommended to a user (e.g., sent to the user's computing device to be displayed to the user so that the user can select the content components and/or web pages if desired). Recommendations can also be based on a user's browsing history (e.g., a recommendation can be made based on similar types of content and/or web pages that the user accesses frequently) and/or based on aggregate browsing history (e.g., a recommendation can be made based on which web pages users' accessed frequently or accessed next after a current web page).

In some embodiments, web page values can be used for comparison purposes. For example, the overall weight of a number of web pages can be presented to a user so that the user can select between them (e.g., two web pages that have the same news article content but have different amounts or types of advertising content).

Figure 19:
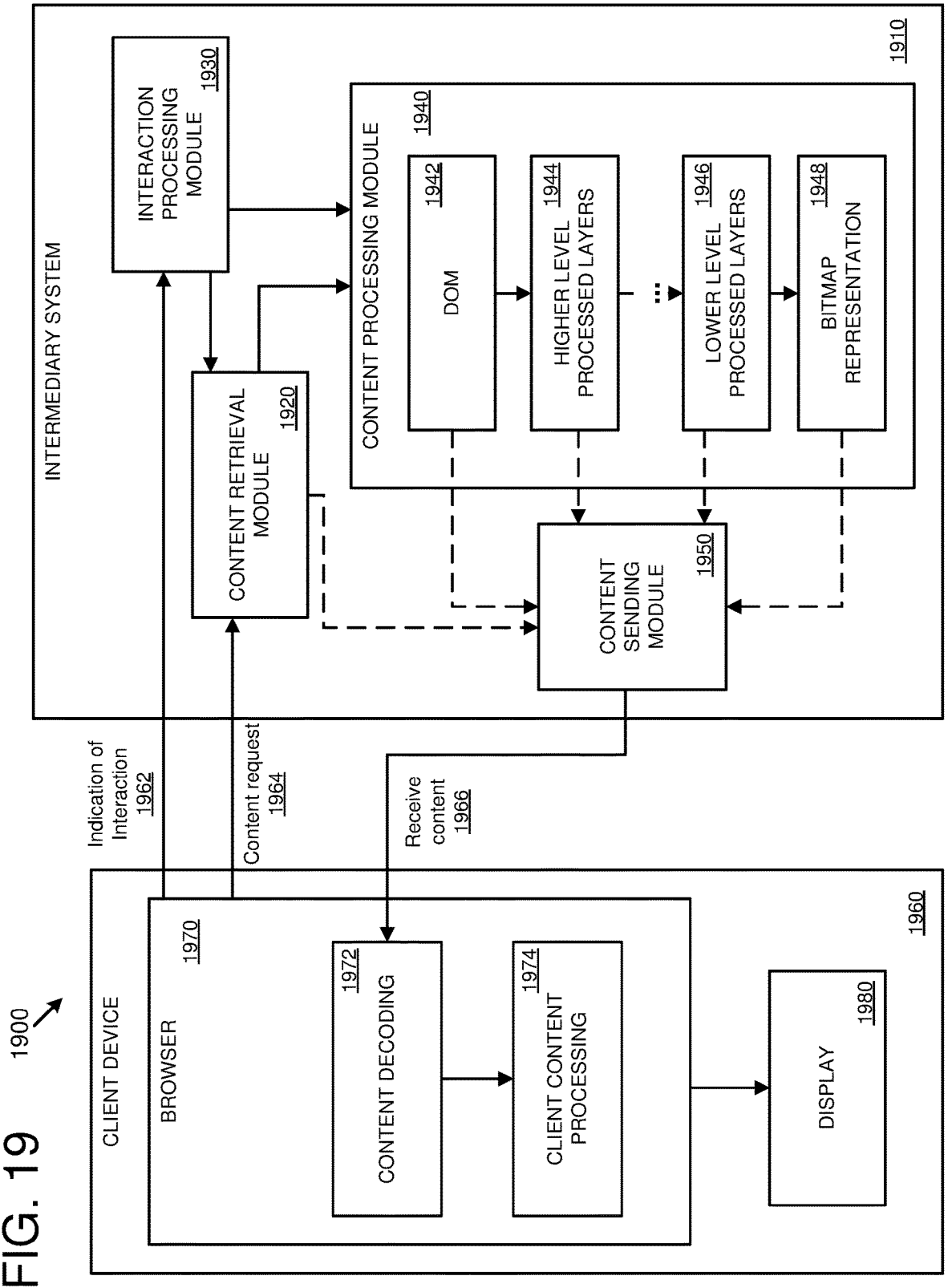
FIG. 19 is a block diagram depicting an example environment for web browsing using an intermediary system.

FIG. 19 is a block diagram depicting an example environment 1900 in which content consumption activity (e.g., web browsing) is performed by a client device 1960 in communication with an intermediary system 1910. For example, the intermediary system 1910 can be a headless browser system that performs web browsing operations independently, or in combination with, the client device 1960. In some implementations, the intermediary system 1910 performs some or all of the functions described above with regards to the network computing and storage provider 107.

The activity shown in FIG. 19 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 1970 of the user device 1960 can send a request for content (as indicated at 1964) to the content retrieval module 1920 of the intermediary system 1910. The request for content can be, for example, a request for a web page generated when the user selects a user-selectable option directing the browser 1970 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 1960, for example one or more of processing capabilities, network connection parameters, and configuration of browser 1970, to name a few.

In some embodiments, when intermediary system 1910 receives the request for a content page, the intermediary system 1910 can assess, for the content page, whether sending the content for the page as processed layers (e.g., at one or more levels of processing) to the client device 1960 will reduce a user-perceived page load time relative to at least one alternative rendering technique. In some cases, the intermediary system 1910 can determine whether a layer transfer rendering technique, in which processed layers are sent, is preferable for a given page load based on a number of factors, for example the speed, bandwidth, and type of network connection of client device 1960 as well as characteristics of the content site. For example, intermediary system 1910 can determine or predict whether the layer transfer rendering technique will reduce a page load time and/or bandwidth consumption compared to fully rendering the content page on the browser 1970 (e.g., sending original HTML and associated web resources and having the browser 1970 perform all of the rendering pipeline operations) or fully rendering the content page on the intermediary system 1910 (e.g., performing all of the rendering pipeline operations and sending a bitmap representation to the client device 1960).

The content retrieval module 1920 can retrieve the content of the content page, for example HTML and associated resources, from content sources (e.g., web servers or content servers) and/or from local storage (e.g., cache). In some implementations, the network connection between the content retrieval module 1920 and the content sources may be faster than the network connection between the client device 1960 and the content sources, thereby reducing latency in rendering the content page for the user. The content source may be the origin content server, a CDN server, a proxy server, or some other source.

The content processing module 1940 (e.g., implementing all or part of a rendering pipeline) can receive content (e.g., web page content) from the content retrieval module 1920. The content processing module 1940 can construct a DOM from of the received content, as indicated at 1942. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file.

Based on the DOM, different levels of processed layers can be generated, which can include higher level processed layers 1944, lower level processed layers 1946 and any processed layers in-between. While two levels of processed layers are depicted (1944 and 1946), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 1940 can also create a bitmap representation of the content (e.g., the web page) using the processed layers, as depicted at 1948. Depending on the specific configuration being used, the content processing module 1940 can create information for one or more of the levels of processing (e.g., 1942, 1944, 1946, and/or 1948). For example, the content processing module 1940 may process the content to create a DOM (as depicted at 1942) and a higher level processed layer (as depicted at 1944) without any additional processing (e.g., without proceeding to lower level processed layers or bitmaps, as depicted at 1946 and 1948).

The intermediary system 1910 supports sending content to the client device 1960 at different levels of processing. For example, the content sending module 1950 can receive raw content (e.g., original HTML content and associated resources) form the content retrieval module 1920. The content sending module 1950 can receive DOM information from the content processing module 1940. The content sending module 1950 can receive different levels of processed layers from the content processing module 1940. The content sending module 1950 can receive bitmap images from the content processing module 1940. These different sources of content are indicated by the dashed lines within the intermediary system 1910. Depending on the specific configuration being used, the content sending module 1950 may receive content from one or more levels of processing (e.g., the content sending module 1950 may only receive lower level processed layers for sending to the client device 1960).

The content sending module 1950 can encode the received content for sending to the client device 1960. For example, the content sending module 1950 can encode layers using a variety of layer encoding techniques and can examine the content of an individual layer to determine which encoding technique to use (e.g., to minimize bandwidth or page load time, for compatibility with a particular client device, etc.).

When the client device 1960 receives the content from the content sending module 1950 (as indicated at 1966), the browser 1970 decodes the content, as indicated at 1972. Decoding the content can involve performing one or more decoding techniques corresponding to the encoding techniques used to encode the content.

The browser 1970 can perform client content processing, as depicted at 1974. For example, the browser 1970 can perform processing operations similar to, or the same as, those performed by the content processing module 1940. The type of processing performed by the browser 1970 can depend on the level of processing performed by the intermediary system 1910. For example, if the content processing module 1940 created a DOM and then a higher level processed layer (e.g., a render layer tree) and sent the higher level processed layer to the client device 1960, then the browser 1970 could complete the processing by creating lower level processed layers (e.g., a graphics layer tree and a composited layer tree) and bitmaps for display, as depicted at 1980 (e.g., in cooperation with a GPU of the client device 1960, not depicted).

In some embodiments, the browser 1970 performs content processing, as depicted at 1974, to create decoded layers that can be provided to a layer compositor (not depicted) for generating instructions for display to display (as depicted at 1980) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers). The layer compositor can use the assembled layers to generate instructions to configure to display a visual representation of the content page.

The browser 1960 can also detect user interaction with elements of the displayed content (e.g., user-selectable user-interface elements such as buttons and menus, scrolling, zooming, etc.) and send indications of user interaction to the interaction processing module 1930, as indicated at 1962. The browser 1970 can also be configured to perform local rendering updates in some embodiments. As discussed above, a layer can be generated corresponding to a scrollable portion of the content page. Accordingly, the browser 1970 can use the scrollable layer data to locally handle scrolling through the layer by updating the portion of the scrollable layer content that is displayed in the viewport, or boundary, of the scrollable layer. The browser 1970 can also detect changing graphical content, for example in a GIF or video, and send a request for updated content to the intermediary system 1910 if needed. In some embodiments the browser 1970 may have received a URL corresponding to video content from the intermediary system 1910, and accordingly may be able to handle the update to the portion of the content page including the video without sending a request to the intermediary system 1910.

For any interactions that are not able to be handled locally by the browser 1970 using the received content, the browser 1970 can send the indications of user interaction, as depicted at 1962, to the interaction processing module 1930. The interaction processing module 1930 can determine whether any updates to the visual representation of the content page are necessitated by the user interaction with the elements of the content. For example, the interaction processing module 1930 can communicate with the content retrieval module 1920 to obtain new or update content. The interaction processing module 1930 can also communicate with the content processing module 1940 to perform processing of content (e.g., an update to the DOM, an update to one or more processing layers, etc.) for sending back to the client device 1960 in response to the interaction.

In some embodiments, the example environment 1900 supports measuring page value. For example, the intermediary system 1910 can receive a request from the client device 1960 to access a current web page. The intermediary system 1910 can identify links to other web pages present within the current web page. The intermediary system 1910 can obtain web page content information (e.g., HTML) for the other web pages and decompose the other web pages into web page content components using the web page content information. The intermediary system 1910 can assign weights to the content components and select which content components and/or which of the other web pages to obtain in advance. The intermediary system 1910 can obtain web page resources for the selected content components and/or other web pages. The intermediary system 1910 can process the obtained web page resources (e.g., via content processing module 1940) and send the processed resources to the client device 1960 (e.g., via the content sending module 1950). The client device 1960 can receive the web page resources and perform client processing (e.g., to create pre-rendered pages).

Figure 20:
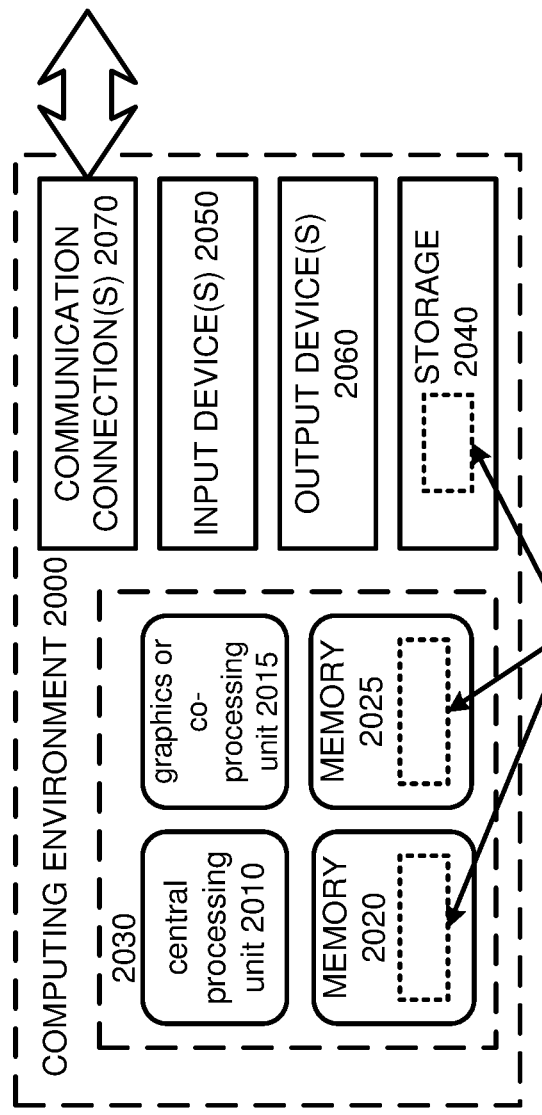
FIG. 20 depicts a generalized example of a suitable computing environment in which the described innovations may be implemented.

FIG. 20 depicts a generalized example of a suitable computing environment 2000 in which the described innovations may be implemented. The computing environment 2000 is not intended to suggest any limitation as to scope of use or functionality, as the innovations may be implemented in diverse general-purpose or special-purpose computing systems. For example, the computing environment 2000 can be any of a variety of computing devices (e.g., desktop computer, laptop computer, server computer, tablet computer, etc.)

With reference to FIG. 20, the computing environment 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing environment 2000 includes storage 2040, one or more input devices 2050, one or more output devices 2060, and one or more communication connections 2070. An interconnection mechanism (not shown) such as a bus, controller, or network interconnects the components of the computing environment 2000. Typically, operating system software (not shown) provides an operating environment for other software executing in the computing environment 2000, and coordinates activities of the components of the computing environment 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing environment 2000. The storage 2040 stores instructions for the software 2080 implementing one or more innovations described herein.

The input device(s) 2050 may be a touch input device such as a touch display or touchpad, a keyboard, a mouse, a pen, a voice input device, a scanning device, or another device that provides input to the computing environment 2000. The output device(s) 2060 may be a display, printer, speaker, CD-writer, or another device that provides output from the computing environment 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method comprising:
   assigning a weight value to a second web page referenced by a first web page based, at least in part, on content types of portions of the second web page, wherein the second web page is a different web page that is referenced by a link within the first web page; and
   determining whether to obtain web page resources for the second web page before a user selects the link to request the second web page based, at least in part, upon the weight value.

2. The method of claim 1, further comprising:
   determining the content types for the portions of the second web page;
   wherein the weight value is assigned to at least one of the portions of the second web page based at least in part on the content type of that portion of the second web page.

3. The method of claim 1, further comprising:
   obtaining web page content information for the second web page, wherein the web page content information describes content structure of the second web page;
   wherein the content of the second web page is determined based at least in part on the web page content information for the second web page.

4. The method of claim 3, further comprising:
   decomposing the second web page into a plurality of web page content components based at least in part on the web page content information; and
   for each of the plurality of web page content components:
   determining a content type of the web page content component; and
   assigning a weight value to the web page content component based at least in part on the content type of the web page content component.

5. The method of claim 3, wherein the web page resources for the second web page are in addition to the web page content information that describes content structure of the second web page.

6. The method of claim 1, wherein the method is performed by one or more computer servers, the method further comprising:
   when the weight value is above a threshold, obtaining the web page resources for the second web page before the user selects, via a client device, the link to request the second web page, wherein obtaining the web page resources for the second web page includes storing the web page resources for the second web page at the one or more computer servers or at the client device.

7. The method of claim 1 wherein the second web page is one of a plurality of web pages that are referenced via links within the first web page.

8. The method of claim 1 wherein the weight value for the second web page is further based upon browsing history associated with the user.

9. The method of claim 1 wherein the weight value for the second web page is further based upon aggregate browsing history of a plurality of users.

10. The method of claim 1, further comprising:
sending the web page resources to a client computing device associated with the user before receiving an indication that the user selects the link to request the second web page.

11. A system comprising:
one or more memories having stored thereon a set of instructions, which if performed by one or more processors, cause the system to perform operations comprising:
for each web page of a plurality of web pages that are referenced via links within a current web page:
assigning a weight value to the web page referenced by the current web page, wherein the weight value is assigned based, at least in part, on content types of portions of the web page; and
determining whether to obtain web page resources for the web page before a user selects the web page at a client device based, at least in part, upon the weight value, wherein obtaining the web page resources for the web page includes pre-caching the web page resources at a server environment and/or at the client device.

12. The system of claim 11, further comprising, for each web page:
obtaining web page content information for the web page, wherein the web page content information describes content structure of the web page; and
determining a content type for at least a portion of the web page based at least in part on the web page content information;
wherein the weight value is assigned to at least the portion of the web page based at least in part on the content type.

13. The system of claim 12, further comprising, for each web page:
decomposing the web page into a plurality of web page content components based at least in part on the web page content information; and
for each of the plurality of web page content components:
determining a content type of the web page content component; and
assigning a weight value to the web page content component based at least in part on the content type for the web page content component.

14. The system of claim 12, wherein the web page resources for the web page are in addition to the web page content information that describes content structure of the web page.

15. The system of claim 11, further comprising, for each web page:
when the weight value is above a threshold, obtaining the web page resources for the web page before the user selects the web page.

16. The system of claim 11, further comprising:
comparing the weight values for the plurality of web pages; and
based on the comparison, selecting one or more of the plurality of web pages with highest weight for obtaining web page resources in advance of user selection.

17. A method comprising:
for each web page of a plurality of web pages that are referenced via links within a current web page:
obtaining web page content information for the web page, wherein the web page content information describes content structure of the web page;
determining a content type for at least a portion of the web page based at least in part on the web page content information;
assigning a weight value to at least the portion of the web page, wherein the weight value is assigned based, at least in part, on the content type; and
determining whether to obtain web page resources for the web page before a user selects the link to request the web page based, at least in part, upon the weight value;
wherein the web page resources for the web page are in addition to the web page content information that describes content structure of the web page.

18. The method of claim 17, further comprising, for each web page:
decomposing the web page into a plurality of web page content components based at least in part on the web page content information; and
for each of the plurality of web page content components:
determining a content type of the web page content component; and
assigning a weight value to the web page content component based at least in part on the content type for the web page content component.

19. The method of claim 17, further comprising:
comparing the weight values for the plurality of web pages; and
based on the comparison, selecting one or more of the plurality of web pages with highest weight for obtaining web page resources in advance of user selection.

20. The method of claim 17 wherein the web page content information indicates different regions of the web page based upon content structure, and wherein the web page content information comprises HTML for the web page.

* * * * *